(12) United States Patent
He et al.

(10) Patent No.: US 9,241,160 B2
(45) Date of Patent: Jan. 19, 2016

(54) REFERENCE PROCESSING USING ADVANCED MOTION MODELS FOR VIDEO CODING

(75) Inventors: Yuwen He, San Diego, CA (US); Yan Ye, San Diego, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 494 days.

(21) Appl. No.: 13/811,179

(22) PCT Filed: Jul. 20, 2011

(86) PCT No.: PCT/US2011/044755
§ 371 (c)(1),
(2), (4) Date: Jan. 18, 2013

(87) PCT Pub. No.: WO2012/012582
PCT Pub. Date: Jan. 26, 2012

(65) Prior Publication Data
US 2013/0121416 A1    May 16, 2013

Related U.S. Application Data

(60) Provisional application No. 61/366,517, filed on Jul. 21, 2010.

(51) Int. Cl.
*H04N 7/26* (2006.01)
*H04N 19/55* (2014.01)
(Continued)

(52) U.S. Cl.
CPC ....... *H04N 19/00642* (2013.01); *H04N 19/533* (2014.11); *H04N 19/543* (2014.11); *H04N 19/55* (2014.11); *H04N 19/567* (2014.11); *H04N 19/597* (2014.11); *H04N 19/105* (2014.11);
(Continued)

(58) Field of Classification Search
CPC .......... H04N 19/00642; H04N 19/567; H04N 19/533; H04N 19/543; H04N 19/55; H04N 19/597; H04N 19/513; H04N 19/117; H04N 19/44

See application file for complete search history.

(56) References Cited

U.S. PATENT DOCUMENTS 8,160,144 B1 * 4/2012 Varadarajan et al. .... 375/240.16
2006/0133508 A1 * 6/2006 Sekiguchi et al. ....... 375/240.17
(Continued)

FOREIGN PATENT DOCUMENTS

JP          09-224252      8/1997
WO        2004/054225     6/2004
(Continued)

OTHER PUBLICATIONS
Itu, "Advanced Video Coding for Generic Audiovisual Services" Mar. 2010.
(Continued)

*Primary Examiner* — Jay Patel
*Assistant Examiner* — Neil Mikeska

(57) ABSTRACT

Processing a reference picture is described. A reference processing unit enables signaling of parameters such as motion model parameters, interpolation filter parameters, intensity compensation parameters, and denoising filter parameters. Methods for estimating the various parameters are also discussed. Processing improves quality of a reference picture prior to its use for prediction of a subsequent picture and thus improves the prediction.

14 Claims, 10 Drawing Sheets

100

(51) Int. Cl.
H04N 19/597 (2014.01)
H04N 19/533 (2014.01)
H04N 19/543 (2014.01)
H04N 19/567 (2014.01)
H04N 19/56 (2014.01)
H04N 19/105 (2014.01)
H04N 19/176 (2014.01)
H04N 19/46 (2014.01)
H04N 19/30 (2014.01)
H04N 19/134 (2014.01)
H04N 19/61 (2014.01)
H04N 19/117 (2014.01)
H04N 19/137 (2014.01)
H04N 19/17 (2014.01)
H04N 19/192 (2014.01)
H04N 19/82 (2014.01)
H04N 19/527 (2014.01)

(52) U.S. Cl.
CPC ............ H04N 19/117 (2014.11); H04N 19/134 (2014.11); H04N 19/137 (2014.11); H04N 19/17 (2014.11); H04N 19/176 (2014.11); H04N 19/192 (2014.11); H04N 19/30 (2014.11); H04N 19/46 (2014.11); H04N 19/527 (2014.11); H04N 19/56 (2014.11); H04N 19/61 (2014.11); H04N 19/82 (2014.11)

(56) References Cited

U.S. PATENT DOCUMENTS

| | | | | |
|---|---|---|---|---|
| 2006/0146138 | A1* | 7/2006 | Xin et al. | 348/207.99 |
| 2007/0147502 | A1* | 6/2007 | Nakamura | 375/240.12 |
| 2009/0225847 | A1 | 9/2009 | Min | |
| 2009/0290637 | A1* | 11/2009 | Lai et al. | 375/240.02 |
| 2010/0215104 | A1* | 8/2010 | Osamoto et al. | 375/240.16 |
| 2011/0243224 | A1* | 10/2011 | Su et al. | 375/240.12 |
| 2012/0026288 | A1 | 2/2012 | Tourapis | |
| 2012/0062756 | A1* | 3/2012 | Tian et al. | 348/218.1 |
| 2012/0092452 | A1 | 4/2012 | Tourapis | |
| 2014/0028793 | A1* | 1/2014 | Wiegand et al. | 348/42 |
| 2015/0124874 | A1* | 5/2015 | Pace et al. | 375/240.08 |

FOREIGN PATENT DOCUMENTS

| | | |
|---|---|---|
| WO | 2010/035733 | 4/2010 |
| WO | 2011/087932 | 7/2011 |

OTHER PUBLICATIONS

SMPTE 421 M, "VC-1 Compressed Video Bitstream Format and Decoding Process" Apr. 2006.

Sullivan, G.J. et al. "Rate-Distortion Optimization for Video Compression", IEEE Signal Processing Magazine, vol. 15, issue 6, Nov. 1998.

He, Y. et al. "Fast Global Motion Estimation for Global Motion Compensation Coding" 2001 IEEE International Symposium on Circuits and Systems, May 2001, pp. 233-236, vol. 2.

Vatis Y. et al. "Motion and Aliasing Compensated Prediction Using a Two-Dimensional Non-Separable Adaptive Wiener Interpolation Filter" IEEE International Conference on Image Processing, vol. 2, Sep. 11, 2005, pp. 894-897.

Nicolas H. et al. "Motion and Illumination Variation Estimation Using a Hierarchy of Models: Application to Image Sequence Coding" Journal of Visual Communication and Image Representation, vol. 6, No. 4, Dec. 1, 1995.

Hampson F.J. et al. "Motion Estimation in the Presence of Illumination Variations" Signal Processing: Image Communication, vol. 16, No. 4, Nov. 1, 2000, pp. 373-381.

Stiller C. et al. "Estimating Motion in Image Sequences—A Tutorial on Modeling and Computation of 2D Motion", IEEE Signal Processing Magazine, IEEE Service Center, Piscataway, NJ, Jul. 1, 1999, pp. 70-91.

Ho Y.S. et al. "CE6: View Interpolation Prediction for Multi-View Video Coding" JVT Meeting of ISO/IEC JTC1/SC29/WG11 and ITU-T SG. 16, Apr. 19, 2007, pp. 1-3.

Pourazad, M. T. et al. "A New Prediction Structure for Multiview Video Coding" IEEE International Conference on Digital Signal Processing, Jul. 5, 2009, pp. 1-5.

Lai, P. et al. "Adaptive Filtering for Cross-View Prediction in Multi-View Video Coding" Visual Communications and Image Processing, Jan. 30, 2007-Feb. 1, 2007, pp. 1-5.

Tang, H. et al. "Motion-Compensated Filtering of Reference Picture for Video Coding" Visual Communications and Image Processing, Jul. 11-14, 2010, pp. 1-3.

Zheng, J. et al. "Adaptive Selection of Motion Models for Panoramic Video Coding" IEEE International Conference on Multimedia and Expo, Jul. 1, 2007, pp. 1319-1322.

Watanabe, T. et al. "In-Loop Filter Using Block-based Filter Control for Video Coding" IEEE International Conference on Image Processing, Nov. 7, 2009, pp. 1013-1016.

Flierl, M. et al. "Rate-Constrained Multihypothesis Prediction for Motion-Compensated Video Compression", IEEE Transactions on Circuits and Systems for Video Technology, vol. 12, No. 11, Nov. 2002, pp. 957-969.

Jozawa, H. et al. "Two-Stage Motion Compensation Using Adaptive Global MC and Local Affine MC", IEEE Transactions on Circuits and Systems for Video Technology, vol. 7, No. 1, Feb. 1997, pp. 75-85.

Tourapis, A.M. et al. "Dynamic Reference Generation for Advanced Video Coding", Jul. 2004, ITU-T Video Coding Experts Group.

Koike Riichiro et al. "Bitrate in Motion-Compensated Prediction Using a 3-D Model", the Institute of Image Information and Television Engineers Technical Reports, vol. 22, No. 8, the Institute of Image Information and Television Engineers, Feb. 3, 1998, pp. 13-18.

* cited by examiner

REFERENCE PROCESSING USING ADVANCED MOTION MODELS FOR VIDEO CODING

CROSS REFERENCE TO RELATED APPLICATIONS

This application claims priority to U.S. Provisional Patent Application No. 61/366,517 filed on Jul. 21, 2010, hereby incorporated by reference in its entirety.

TECHNOLOGY

The disclosure relates generally to image processing and video processing. More specifically, it relates to reference processing using advanced motion models for video coding.

BACKGROUND

In motion compensated, prediction based video coding schemes, quality of reference pictures used for the video coding schemes can considerably affect coding efficiency. That is, a higher quality reference picture that is also more correlated with a source picture generally results in improved coding advantage. Coding advantage includes such factors as improved coding efficiency, reduced complexity, and easier parallelization.

FIG. 1 shows an implementation of a conventional video coding system. In conventional video coding systems such as the conventional video coding system shown in FIG. 1, reference pictures are retrieved from a reference picture buffer (100), generally without any additional processing applied to the reference pictures. The reference pictures are generally used for prediction of subsequent pictures.

Lack of any additional processing occurs in many coding scenarios. Such coding scenarios include coding for static video sequences or for sequences moving with a consistent, translational motion. However, improved coding advantage can be achieved by pre-processing the reference pictures before using them for prediction of the subsequent pictures. A scenario for which pre-processing is used is that of stereo or multi-point video coding applications, where certain views/layers are utilized in predicting other views/layers and where the other views/layers may be captured at different angles from one another.

The following cases are incorporated herein by reference: International Patent Application No. PCT/US2010/031762 filed 20 Apr. 2010 (International Publication No. WO/2010/123909 published 28 Oct. 2010); International Patent Application No. PCT/US2010/040545 filed 30 Jun. 2010 (International Publication No. WO/2011/005624 published 13 Jan. 2011); International Patent Application No. PCT/US2011/020163 filed 5 Jan. 2011 (not yet published).

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 9 shows a first example of pixel symmetry.

FIG. 10 shows a second example of pixel symmetry.

DESCRIPTION OF EXAMPLE EMBODIMENTS

Figure 1:
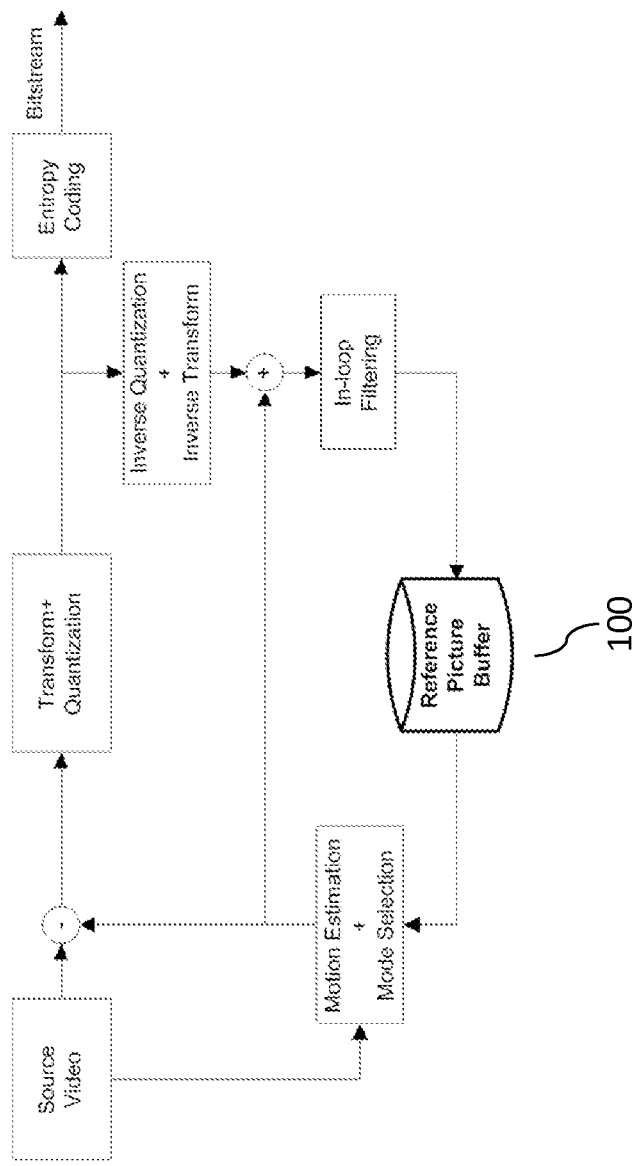
FIG. 1 shows an implementation of a conventional video coding system.

Embodiments of the present disclosure relate to image processing and video processing.

According to a first embodiment of the disclosure, a method for processing a reference picture is provided, comprising: i) performing motion estimation on an original picture to be encoded, based on a reconstructed reference picture, and a processed reference picture estimate; ii) further processing the motion estimated picture to obtain a further processed reference picture estimate; and iterating the motion estimation and the further processing to provide a processed reference picture.

According to a second embodiment of the disclosure, an iterative method for estimating motion model parameters of a reconstructed reference picture or a region of the reconstructed reference picture of a reference picture buffer when performing reference picture processing in a single-layered or multi-layered video coding system is provided, the method comprising: i) performing motion estimation based on an original picture to be encoded and the reconstructed reference picture or a region of the reconstructed reference picture of the reference picture buffer; ii) performing a further motion estimation to provide motion model parameters; iii) performing warping according to the motion model parameters to obtain a warped picture; and iterating i)-iii), wherein the motion estimation of i) in subsequent iterations is based on the original picture to be encoded, the reconstructed reference picture or a region of the reconstructed reference picture of the reference picture buffer, and the warped picture.

According to a third embodiment of the disclosure, an iterative method for estimating motion model parameters of a reconstructed reference picture or a region of the reconstructed reference picture of a reference picture buffer when performing reference picture processing in a single-layered or multi-layered video coding system is provided, the method comprising: i) performing motion estimation based on an original picture to be encoded and the reconstructed reference picture or a region of the reconstructed reference picture of the reference picture buffer; ii) performing a further motion estimation to provide motion model parameters; iii) processing the motion model parameters to provide at least one of interpolation filter parameters and intensity compensation parameters; iv) performing warping according to the motion model parameters and the at least one of interpolation filter parameters and intensity compensation parameters to obtain a warped picture; and iterating i)-iv), wherein the motion estimation of i) in subsequent iterations is based on the original picture to be encoded, the reconstructed reference picture or a region of the reconstructed reference picture of the reference picture buffer, and the warped picture.

According to a fourth embodiment of the disclosure, a method of decoding a reconstructed reference picture or a region of the reconstructed reference picture of a reference picture buffer at a decoder, the decoder adapted to receive and parse parametric information acquired from an encoder, when performing reference picture processing in a single-layered or multi-layered video coding system is provided, the method comprising: i) performing warping of an input picture to obtain a first processed picture; and ii) applying intensity compensation to the first processed picture to obtain a second processed picture.

A. Reference Picture Processing

Figure 2:
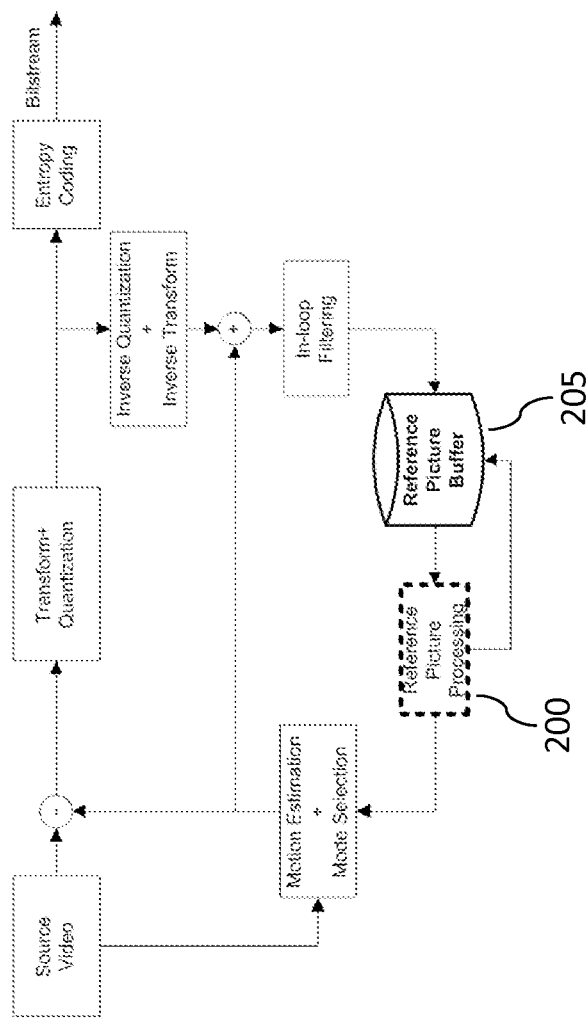
FIG. 2 shows an implementation of a video coding system that utilizes a reference processing unit.

FIG. 2 shows an implementation of a video coding system that utilizes a reference processing unit (200), henceforth referred to as RPU. The RPU (200) enables signaling of processing parameters such as filter parameters, motion compensation parameters, and other modeling parameters. The signaling can be applied on reference pictures already available in a reference picture buffer (205) in order to generate new reference pictures. These new reference pictures are generally more correlated with subsequent pictures that need to be processed. If desired, the signaling can be done at a region level instead of a global level, allowing finer control and further improvements in coding advantage.

Two exemplary references that introduce use of the reference processing unit (200) are U.S. Provisional Application No. 61/170,995, entitled "Directed Interpolation and Post-Processing", filed on Apr. 20, 2009, and U.S. Provisional Application No. 61/223,027, entitled "Encoding and Decoding Architectures for Format Compatible 3D Video Delivery", filed on Jul. 4, 2009. Both these references are incorporated herein by reference in their entirety.

By utilizing the RPU (200) in the video coding system, applications that support stereo and multi-point video coding have been achieved. Such applications are realized by selecting advanced motion models and filtering mechanisms to apply to each reference picture from a previous layer picture prior to using each reference picture for prediction of a subsequent enhancement layer picture.

Techniques that involve selecting appropriate advanced motion models (including but not limited to translation, zooming, rotation, affine, and perspective transformations) and filtering mechanisms (including but not limited to bilinear, bicubic, Mitchell-Netravali, Lanczos, and user specified interpolation filters) for each reference picture are applied in both frame compatible 3D delivery methods and 2D compatible 3D delivery methods. These 3D delivery methods are similar to those currently supported by the Multi-View Video Coding (MVC) extension of MPEG-4 AVC/H.264. Unlike MVC, where prediction of subsequent enhancement layers considers reference pictures from previous layers without processing, the RPU (200) enables refinement of the reference pictures from previous layers prior to their use for prediction of subsequent enhancement layers. The refinement generally improves coding advantage.

Several embodiments of the present disclosure are directed to 2D compatible multi-layered 3D coding methods. The presented coding methods can also be used in frame compatible 3D coding methods and in other applications such as generic and scalable 2D coding. Additionally, the presented coding methods can be used in combination with intelligent and adaptive interpolation filtering, intensity compensation methods, and deblocking/denoising filters.

With continued reference to FIG. 2, which shows a video coding system that utilizes the RPU (200), a reference picture from a reference picture buffer (205) is processed after the reference picture is stored in or retrieved from the reference picture buffer (205). By processing the reference picture, the reference picture can provide a more accurate prediction of subsequent video pictures than for a case where the reference picture is not processed. Such processing methods generally include motion compensation methods through use of motion models. Specific categories of motion models will be described later in the disclosure.

One exemplary way to process the reference picture is to apply a certain global or localized motion model to the reference picture. In combination with motion compensation methods, processing by linear or non-linear filters can also be used for fractional position interpolation, denoising, artifact reduction (for example, deblocking), and image enhancement.

Figure 3:
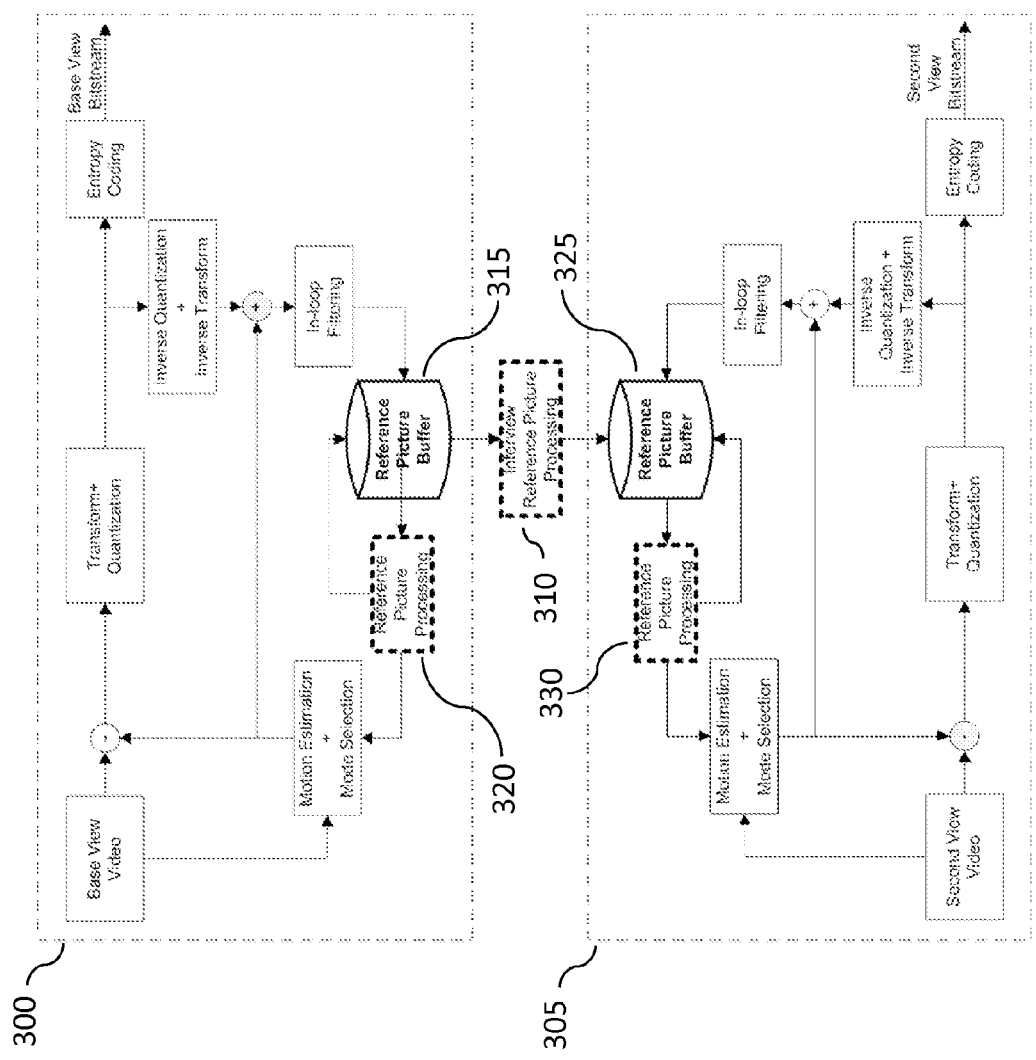
FIG. 3 shows an implementation of a stereo video coding system that utilizes a reference processing unit.

FIG. 3 shows use of reference picture processing technology in a multi-view or multi-layered video coding system. With reference to FIG. 3, the system comprises a base view (300) and a second view (305). Additionally, the system comprises an inter-view RPU (310). The base view (300) and the second view (305) have a corresponding base view reference picture buffer (315) and a second view reference picture buffer (325). The base view reference picture buffer (315) is connected with a base view RPU (320) whereas the second view reference picture buffer (325) is connected with a second view RPU (330). The inter-view RPU (310) connects with both the picture buffers (315, 325). Although FIG. 3 shows a two-view or two-layer video coding system, additional views or layers with additional RPUs for each view or layer and additional inter-view or inter-layer RPUs can also be considered.

With continued reference to FIG. 3, reference pictures within the base and second views (300, 305) are processed by the corresponding RPUs (320, 330). Additionally, prior to sending reference pictures from the base view (300) to the second view (305), the inter-view RPU (310) processes the reference pictures received from the base view reference picture buffer (315). The processing by the inter-view RPU (310) generally occurs after all the reference pictures are stored in the reference picture buffer specific for each view (315, 325) or when a certain reference picture is considered for prediction of a subsequent picture (such as in on the fly RPU processing). For example, the reference pictures for the base view (300) may be warped according to a specified motion model in order to generate a new reference picture that can be used for prediction of subsequent pictures in either the base view (300), the second view (305), or both views (300, 305).

Original reference pictures in each buffer (315, 325) are used to generate additional reference pictures for either the same view (300, 305) or for the other view (300, 305). The original reference pictures or the newly generated reference pictures can be processed again given new processing parameters, such as motion model, interpolation filter, and intensity compensation parameters, that may be specified for subsequent pictures to be processed. For example, for inter-view reference processing (310), motion model information may represent discrepancy between views (300, 305), such as different camera positions and angles utilized for capturing each view (300, 305). The motion model information may include not only motion warping information but also additional information indicating, for instance, which interpolation filter to use in order to generate sub-pixel positions as well as intensity compensation information. The processing model could involve denoising filters, such as Gaussian and/or separable linear filters, non-linear filters such as median or ordered filters, and so forth. Deblocking methods that can be specified across regions can also be used.

In a general case, number of views/layers processed by the video coding system can be much more than the two view/layer video coding system shown in FIG. 3. In general, reference pictures of a particular view/layer can be processed so as to generate additional reference pictures of another view/layer. Additionally, the reference pictures of the particular view/layer can be processed so as to generate enhanced reference pictures for the particular view/layer itself.

In terms of a parameter estimation process, the motion model information can be estimated or selected at the encoder side based on a motion model that uses appropriate warping parameters. The warping parameters can depend upon a single specified criterion or a combination of specified criteria such as visual quality, algorithm complexity, bit rate, among other criteria. Alternatively, the motion model information can be estimated or selected at the encoder side based on a motion model that uses appropriate interpolation filter parameters, intensity compensation parameters, or deblocking/denoising parameters. Additionally, the motion model information can be estimated or selected at the encoder side based on an appropriate combination of the warping parameters, interpolation filter parameters, intensity compensation parameters, and deblocking parameters used, among other parameters not heretofore listed. Additional benefits can be achieved by combining (cascading or performing in combination) linear and non-linear filtering in addition to use of advanced motion models.

Figure 12:
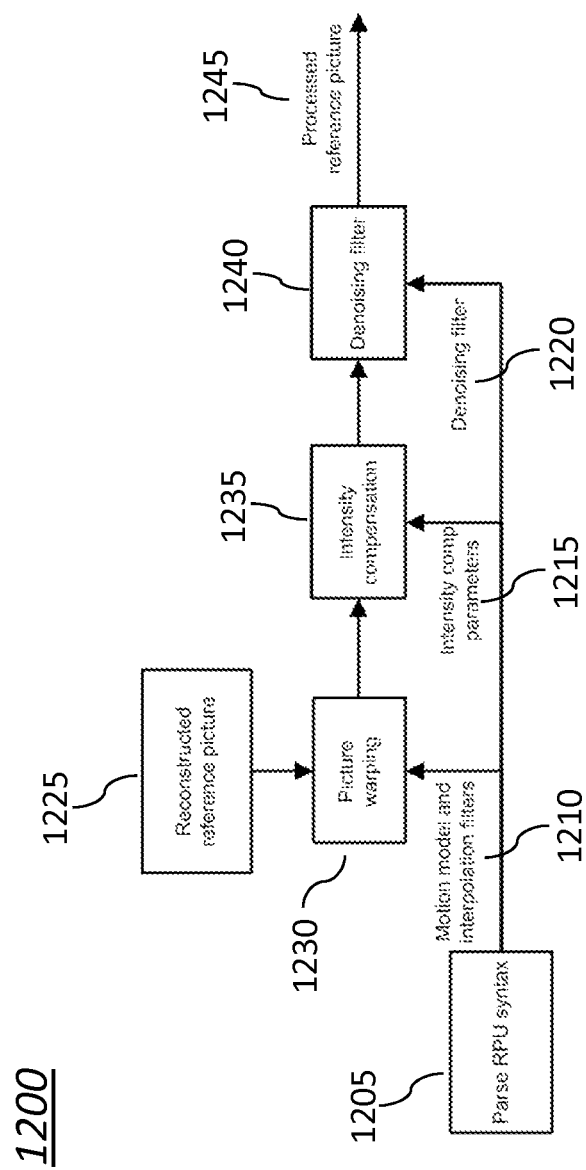
FIG. 12 shows a block diagram of a decoder side of a reference processing unit.

FIG. 12 shows an exemplary embodiment of a decoder side of a reference processing unit. All of the motion model information, including but not limited to warping parameters, interpolation filter parameters, intensity compensation parameters, and deblocking/denoising parameters, can be encapsulated in a reference processing unit's payload and sent to a decoder (1200). In other words, the RPU's payload contains the motion model information directly used for processing reference pictures. In contrast to the payload, the RPU may also contain additional header information that may describe the payload and how that may need to be processed or used for reconstruction and display of the signal.

The decoder of the RPU comprises a parsing unit (1205) that parses the payload of the RPU and uses information extracted from the payload to recover processing parameters identical or nearly identical to those used by an encoder (not shown in FIG. 12) of the RPU. Specifically, the embodiment shown in FIG. 12 obtains, from the payload, information concerning motion model parameters (1210), interpolation filter parameters (1210), intensity compensation parameters (1215), and denoising filter parameters (1220) used by the encoder.

These parameters (1210, 1215, 1220) are utilized in processing a reconstructed reference picture (1225). The reconstructed reference picture (1225) may be an original reference picture or a previously RPU processed reference picture. An original reference picture refers to a reference picture taken straight from a reference picture buffer (such as the reference picture buffer (205) shown in FIG. 2) without any processing. In contrast, since multiple RPUs can be cascaded, a previously RPU processed reference picture is a reference picture from a reference picture buffer that has been processed by an RPU or multiple RPUs. Consequently, a current RPU encoder/decoder under consideration can take as an input reference picture an original reference picture or a previously RPU processed reference picture from a prior layer or prior encoding/decoding step.

With reference back to FIG. 12, an original reference picture or a previously RPU processed reference picture serves as an input reference picture, referred to as the reconstructed reference picture (1225), to a current RPU decoder under consideration. The processing of the reconstructed reference picture (1225) is shown as a series of steps comprising picture warping (1230), intensity compensation (1235), and noise removal (1240) by utilizing the parameters (1210, 1215, 1220) obtained from the encoder. A result of the processing is a processed reference picture (1245). The processed reference picture (1245) of the current RPU decoder under consideration may serve as an input reference picture to a subsequent RPU decoder and/or as a picture from which prediction of subsequent pictures may be made. Since the decoder recovers a processing model similar to that used by the encoder, the processed reference picture (1245) undergoes processing similar to that performed at the encoder.

To further improve coding efficiency, different reference picture processing payload information may be sent to different regions of the reconstructed reference picture (1225). In other words, the reconstructed reference picture (1225) can be partitioned into multiple regions and each region can have its own optimized processing parameters. This can allow for more accurate motion model parameters and filtering parameters to be applied to each specific region.

Figure 4:
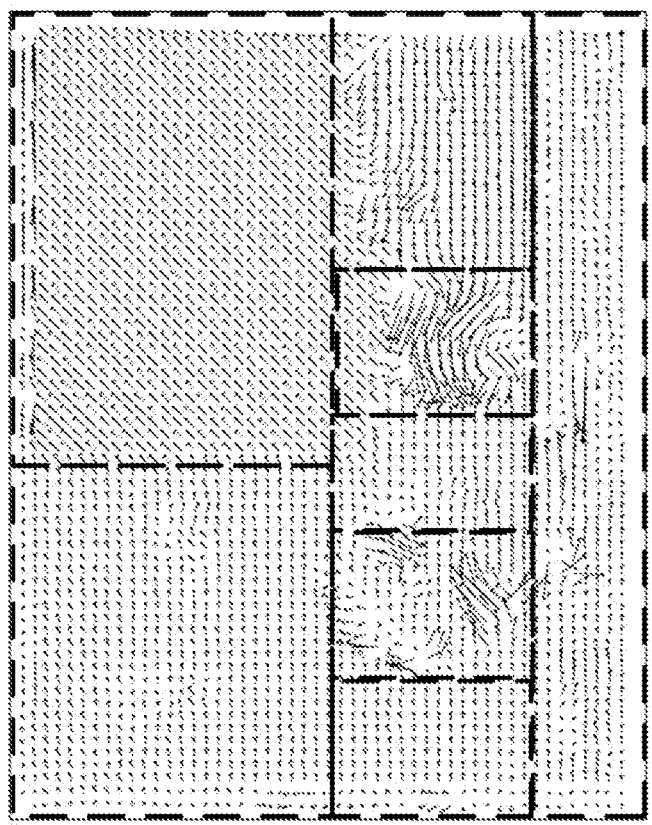
FIG. 4 shows a reference picture that is partitioned into non-overlapping regions.
Figure 5:
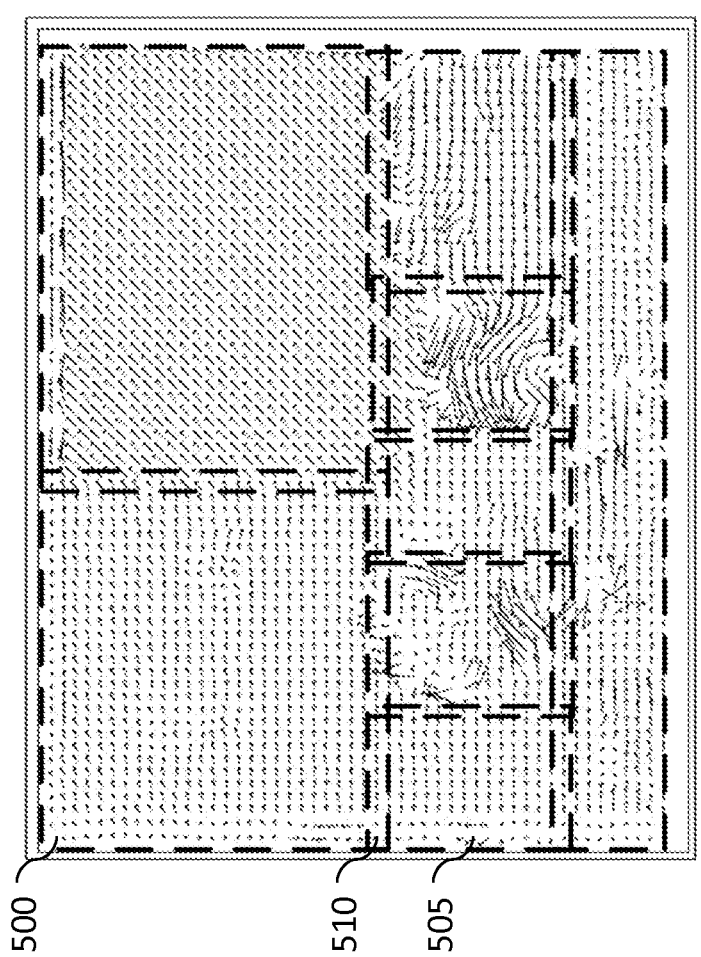
FIG. 5 shows a reference picture that is partitioned into overlapping regions.

FIG. 4 shows a first example of partitioning a reference picture into many regions according to homogeneity of motion within each region. Additionally, the many regions are non-overlapping. Similarly, FIG. 5 shows a second example of partitioning a reference picture into many regions according to homogeneity of motion. However, the many regions in FIG. 5 are overlapping. In both FIGS. 4 and 5, each partition can be described using a separate set of parameters.

In cases where multiple motion regions with different motion parameters exist in one reference picture or where different blurring and focus characteristics exist in one reference picture, region based RPU signaling will likely result in higher coding efficiency. Regions can be rectangular, as shown in FIGS. 4 and 5, but regions can also be of any arbitrary shape. Regions can be non-overlapping, as in FIG. 4, or overlapping, as in FIG. 5.

Additionally, regions can contain single or multiple processing parameters. For instance, a particular region may be represented not only by a single motion model. For instance, both a zoom motion model and an affine motion model may be signaled to the same region, along with other parameters such as intensity compensation parameters. Note that overlapping portions of the regions generally have multiple motion models applied to them. A prediction for the region on a subsequent picture based on the region of the present reference picture would be obtained by an average or a weighted average of motion vectors estimated using each motion model. By way of example and not of limitation, a specific averaging method can be signaled or can be determined based on similarities or differences between the motion vectors of the particular region and its neighboring regions.

Deblocking methods can be applied across regions, which may include pixel based methods and/or other frequency domain (such as overcomplete denoising) methods. Deblocking strength, which quantifies how much filtering is applied across the regions, can be based on differences in motion model or prediction method used in adjacent partitions as well as differences in the motion model parameters between adjacent partitions.

In a particular case where two regions use an identical prediction method and an identical or similar motion model, no deblocking filtering is performed. Motion models are considered similar if absolute differences of all motion vectors, obtained by applying the different motion models, are below a certain predefined threshold or set of thresholds. On the other hand, if different motion models are used or difference between motion vectors are significant (differences are larger than a threshold or set of thresholds), strong deblocking is applied. Some regions in the reference picture may require more filtering while other regions require less filtering. Amount of filtering applied to any particular region depends on the particular region's motion model and prediction method as well as the relationship between this particular region's motion model and prediction method and the motion model and prediction method of this particular region's neighboring partitions. Additionally, the amount of filtering applied to the region may be affected by texture characteristics within the particular region.

Although a region based RPU may entail higher bit overhead, the encoder may apply rate distortion based decisions to find an optimal region partitioning as well as an optimal motion model and prediction method for each region.

As an example, a video coding system can examine performance of using an RPU that processes reference pictures with a single partition rather than performance of using an RPU that processes reference pictures with M×N partitions. A decision concerning an optimal combination of region partitioning, motion model, and prediction method can be made prior to encoding. The decision may be made, for instance, by only comparing parameters of the generated reference picture against those of a source picture to be encoded. The decision can also be made by considering complete, partial, or simulated encoding in the RPU. Simulated encoding is performed, for example, by using a lower resolution representation of the pictures. The method selected to be signaled may be chosen based on, for instance, performance in terms of encoding. Performance may be evaluated using a certain criterion such as combined rate distortion performance given a particular Lagrangian multiplier.

B. Motion Models

In an embodiment of a video coding system, several different motion models are considered since the different motion models provide a variety of alternative implementations, with each implementation entailing different complexity and motion coverage. Motion models considered include translation, zooming, affine, perspective, isotropic, and polynomial models, among others. A combination of these motion models, as discussed earlier, is also possible.

These motion models can generally describe accurately complex motion that may exist in 3D real-world scenes. However, although motion models such as the perspective motion model can accurately describe 3D motion, these motion models can be computationally complex to estimate. Additionally, an estimation process corresponding to these motion models can be sensitive to noise. In these cases where the estimation process is sensitive to noise, pre-filtering or a more robust estimator can improve the model estimation process. Pre-filtering may be performed on the reference picture, the original picture, or motion vectors of the reference or original picture. An example of a robust estimator is one that utilizes a Levenberg-Marquadet method. Furthermore, the motion compensation process for these motion models, which would need to be applied at the decoder, may itself be complex.

On the other hand, simpler motion models such as the translational model tend to be easier to estimate and more robust to noise. Therefore, having flexibility in the present embodiment of the video coding system to consider multiple different motion models with different complexity and performance characteristics for reference picture processing allows for easier consideration of different complexity and performance tradeoffs when designing the encoder and controlling the complexity of the decoder required to operate with the encoder. As discussed earlier, a combination of different motion models, such as a combination of the translational and zoom models can also be used to improve performance.

Selection of the motion model for each region of the reference picture depends on a variety of conditions such as distortion requirements, bit rate expectations, and motion model complexity. More complex models may additionally depend on conditions such as rate-distortion (RD) cost and rate-distortion-complexity (RDC) cost. The RD cost of a motion model can be, for example, calculated as in Equation (1) using Lagrangian optimization methods:

$$RD(m)=D(\text{Warp}(m,R),O)+\lambda^*(R(\text{motion\_model})+R(\text{filter})+R(\text{intensity\_comp})) \quad (1)$$

Function Warp(m, I), seen in Equation (1) above, is a warping function used for motion compensation. The Warp (m,I) function depends on the motion model that is applied, such as those motion models listed in Table 1. Specifically, Warp(m, I) is a function of m, which is the motion model, and I, which is an input image. Function R(t), also seen in Equation (1) above, gives a rate at which to encode side information for a processing tool t. Function D(x, O) is a distortion metric function, such as sum of square errors (SSE). Specifically, D(x, O) is a function of x, which is a processed signal, and O, which is an original signal.

More advanced methods may, for instance, consider not only distortion between a warped picture and an original picture but also final coding efficiency using the warped picture inside a video coding system. If the consideration of the distortion and the final coding is too computationally complex, different estimates can be used. For example, only block-based motion estimation may be used. Alternatively, the estimates may optionally consider impact of any available references, such as temporal references, within a codec for the estimation process. Estimation can also be made by considering a sub sampled version of the warped pictures and original pictures. Estimation can also be performed using different resolution images by using, for example, a hierarchical based motion estimation approach. An example of a hierarchical based motion estimation is given as follows. Estimation of the various RPU parameters (motion model parameters, interpolation filter parameters, etc.) may be derived from a lowest resolution warped reference picture and an original source picture. Further estimation of the various RPU parameters may be derived from a higher resolution warped reference picture and the original source picture. This further estimation, as well as any subsequent estimations, further refine the values of the various RPU parameters.

The same applies to rate consideration, where instead of only considering rate required for coding the various RPU parameters (motion model parameters, interpolation filter parameters, etc.), rate required to encode the entire picture is also considered. In the case where both the rate required for coding the RPU parameters and the rate required to encode the entire picture are considered, different Lagrangian parameters can be selected for use between the RPU signaled parameters versus the actual bits signaled for the encoding of the picture. Simplifications may include consideration of the local parameters, such as motion and reference indices that can potentially be used to encode a picture. In particular, encoding is not performed on the entire picture; instead, only localized motion estimation is performed.

Table 1, shown below, lists various motion models.

TABLE 1

Motion models

| Index | Group index for motion model selection algorithm | Motion model | Number of model parameters | Definition of transformation |
|---|---|---|---|---|
| 0 | 0 | Translation | 2 | Equation (2) |
| 1 | 1 | Zoom | 4 | Equation (3) |
| 2 | 1 | Isotropic | 4 | Equation (4) |
| 3 | 2 | Affine | 6 | Equation (5) |
| 4 | 3 | Perspective | 8 | Equation (6) |
| 5 | 4 | Polynomial | 12 | Equation (7) |

The last column of Table 1 refers to transformation equations that define each motion model. In particular, the equations for each model are given as follows:

$$\begin{cases} u'_x = u_x + h_0^x \\ u'_y = u_y + h_0^y \end{cases} \quad (2)$$

$$\begin{cases} u'_x = h_1^x u_x + h_0^x \\ u'_y = h_1^y u_y + h_0^y \end{cases} \quad (3)$$

$$\begin{cases} u'_x = h_1^y u_y + h_1^x u_x + h_0^x \\ u'_y = h_1^y u_y + h_1^x u_x + h_0^y \end{cases} \quad (4)$$

$$\begin{cases} u'_x = h_2^x u_y + h_1^x u_x + h_0^x \\ u'_y = h_2^y u_y + h_1^y u_x + h_0^y \end{cases} \quad (5)$$

$$\begin{cases} u'_x = (h_2^x u_y + h_1^x u_x + h_0^x)/(1 + h_3^y u_y + h_3^x u_x) \\ u'_y = (h_2^y u_y + h_1^y u_x + h_0^y)/(1 + h_3^y u_y + h_3^x u_x) \end{cases} \quad (6)$$

$$\begin{cases} u'_x = h_5^x u_y^2 + h_4^x u_x u_y + h_3^x u_x^2 + h_2^x u_y + h_1^x u_x + h_0^x \\ u'_y = h_5^y u_y^2 + h_4^y u_x u_y + h_3^y u_x^w + h_2^y u_y + h_1^y u_x + h_0^y \end{cases} \quad (7)$$

The transformation equations are defined from Equation (2) to Equation (7). In the equations, $(u_x, u_y)$ is a source position and $(u'_x, u'_y)$ is a corresponding position of the source position $(u_x, u_y)$ transformed by a certain motion model (as defined by various parameters of the form $h_i^j$). The parameters are shown in Table 2 below. Table 2 provides insight of what types of motion/deformation each motion model provides.

TABLE 2

Meaning of motion model parameter

| Motion model | Translation parameters | Zoom parameters | Rotation/twist parameters | Disparity parameters |
|---|---|---|---|---|
| Translation | $h_0^x, h_0^y$ | None | None | None |
| Zoom | $h_0^x, h_0^y$ | $h_1^x, h_1^y$ | None | None |
| Isotropic | $h_0^x, h_0^y$ | $h_1^x$ | $h_1^y$ | None |
| Affine | $h_0^x, h_0^y$ | $h_1^x, h_2^y$ | $h_2^x, h_1^y$ | None |
| Perspective | $h_0^x, h_0^y$ | $h_1^x, h_2^y$ | $h_2^x, h_1^y$ | $h_3^x, h_3^y$ |
| Polynomial | $h_0^x, h_0^y$ | $h_1^x, h_2^y$ | $h_2^x, h_1^y$ | $h_3^x, h_4^x, h_5^x$ $h_3^y, h_4^y, h_5^y$ |

As can be seen from Table 2, the translational model only provides coverage for translation, the zoom model comprise the translation parameters and zooming parameters of the translational model, the isotropic model assumes equal zoom and rotation across both dimensions, and so on. The polynomial model is the most complex model among the motion models shown in Tables 1 and 2. However, this model can provide a more comprehensive motion/deformation coverage compared to the other models presented in these tables. A combination of these models is also possible using a multi-hypothesis method, where multiple motion models can be signaled per region, warping based motion compensation can be performed with each motion model separately, and then multiple hypotheses can be averaged or weighted averaged to generate a final hypothesis for prediction of a subsequent picture.

B.1 Motion Model Estimation and Coding

There are several kinds of motion model estimation methods. Some common methods include pixel-level motion estimation, frequency/phase correlation based motion estimation, and motion field estimation (such as optical flow field). Pixel-level motion estimation can be computationally complex and easily affected by noise and other image characteristics such as lighting conditions. On the other hand, frequency/phase correlation methods and optical flow methods can provide sufficient results for most applications.

For instance, phase correlation methods and optical flow methods can be utilized in conjunction with each other. Phase correlation methods enable derivation of translational parameters and estimates of rotation and zoom parameters through transformations of the reference and source pictures. Optical flow methods can be utilized for the remaining parameters not yet estimated by the phase correction methods; in other words, optical flow methods are essentially simpler models. Optical flow methods can make use of block-based motion estimation methods, with or without consideration to intensity parameters.

Block based motion estimation methods and frequency/phase correlation methods can be used to estimate optical flow information. For instance, instead of using actual optical flow information to represent a motion field of a picture, block-based motion estimation methods can be used to derive motion for different block partitions, where the block partitions can be of any size M×N. The size can, for instance, be 8×8, 2×2, 4×2, or even 1×1. Additionally, partitions need not be rectangular; they can be of any shape.

In general, motion vectors can be of any precision. By way of example and not of limitation, motion vectors can be of integer, half-pel, quarter-pel, or floating point precision. Given information on the motion vectors, a gradient descent method can be used to estimate the motion model parameters. The gradient descent method can use fitting methods such as a Newton Raphson and Levenberg-Marquadet iterative method (see reference [6]) or a least square estimator.

Figure 6:
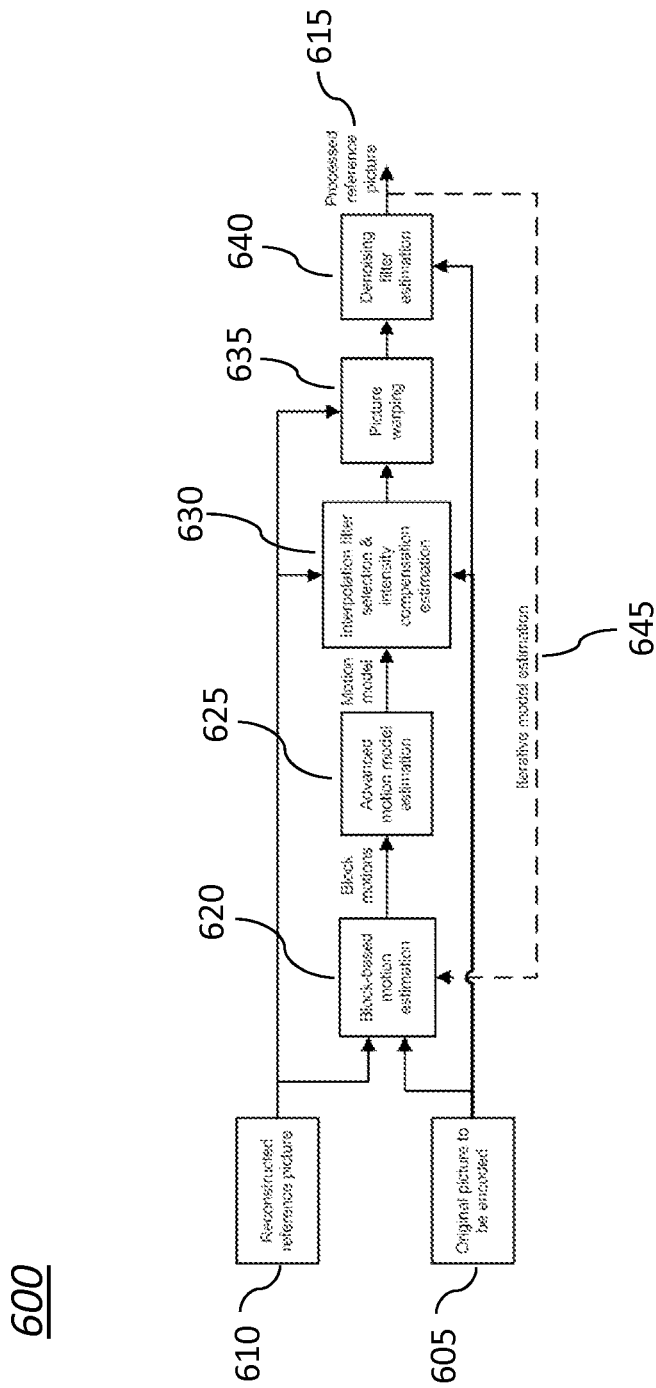
FIG. 6 shows an exemplary embodiment of a motion model estimation process on an encoder side.

FIG. 6 shows a motion model parameter estimation process (600) of the reference picture unit at the encoder side. Essentially, the motion model parameter estimation process is an iterative estimation process. With reference to the embodiment of the motion model parameter estimation process (600) shown in FIG. 6, the estimation process (600) utilizes an original source picture (605) that needs to be encoded, a reconstructed reference picture (610), and a processed reference picture (615).

Similar to the RPU decoder in FIG. 12, the reconstructed reference picture (610) of the RPU encoder in FIG. 6 is either an original reference picture or a previously RPU processed reference picture. An original reference picture refers to a reference picture prior to any RPU processing. Since multiple RPU encoders may be cascaded, a previously RPU processed reference picture is a reference picture that has been processed by an RPU or multiple RPUs. Consequently, a current RPU encoder under consideration can take as an input reference picture an original reference picture or a previously RPU processed reference picture from a prior layer or prior encoding step. The processed reference picture (615) of the current RPU encoder may serve as an input reference picture to a subsequent RPU encoder and/or to an RPU decoder.

Each of the three pictures (605, 610, 615) is used to obtain information used to achieve block-based motion parameter estimation (620), motion model parameter estimation (625), interpolation filter parameter estimation (630), intensity compensation parameter estimation (630), and denoising filter parameter estimation (640). The iterative aspect of the estimation process (600) occurs when the processed reference picture (615) is fed back into the estimation process (600) by way of a feedback loop (645). The reconstructed reference picture (610) will be warped (635). Picture warping (635) will perform picture transformation according to estimated motion parameters from blocks 620 and 625 as well as estimated interpolation filter parameters and intensity compensation parameters from block 630. Subsequent to picture warping (635), the denoising filter parameter estimation (640) will be achieved by comparing the warped reference picture to the original source picture (605). The feedback loop (635) sends the processed reference picture (615) back through the estimation process (620, 625, 630, 640) and picture warping (635) in order to obtain more refined values for each of the parameters estimated by blocks 620, 625, 630, and 640.

It should be noted that the original source picture (605) itself is not processed. The original source picture (605) is only used in the encoder to derive the parameters needed to generate the processed reference picture (615). From FIG. 6, the parameters are the block-based motion parameters, motion model parameters, interpolation filter parameters, intensity compensation parameters, and denoising filter parameters. Specifically, these parameters are used to generate the processed reference picture (615) such that they closely match the original source picture (605). Although the preceding discussion was made with reference to the parameter estimation depicted FIG. 6, the preceding discussion applies to parameter estimation in RPUs in general.

With relation to the decoder side of the RPU, an embodiment of which is shown in FIG. 12, the original source picture (605), as shown in FIG. 6, is not available to the decoder. However, the parameter estimation shown in FIG. 6 provides the values for the parameters that are sent to the decoder in form of the RPU payload, as previously discussed. The decoder parses (1205) the payload for information regarding the parameters (1210, 1215, 1220 in FIG. 12). The reconstructed reference picture (1225) at the decoder side is processed using these estimated parameters (1210, 1215, 1220) to obtain the processed reference picture (1245).

Although not shown in FIG. 6, the process can also consider motion parameters from previously processed and encoded pictures or even previously processed regions within the same picture, assuming in the latter case the signaling process occurs at the regional level. Motion models of previously processed and encoded pictures can be used to initialize the motion estimation process, but the motion models can also be used to generate new "hypothesis" references by applying the motion estimation values to the current reference picture. The new hypothesis references can then be used to perform subsequent motion estimation. A final motion model can be combined with the original hypothesis motion model to create the final motion model used for prediction of subsequent pictures.

In a different embodiment of the motion model estimation process (600) on the encoder side, multiple final hypotheses are generated, from which one final hypothesis can be selected. Selection of the final hypothesis can be made given some criteria concerning the original hypothesis or another hypothesis that may have been generated using a different motion estimation process. A different motion estimation process can, for instance, entail performing motion estimation directly without using any predictors or using different predictors. The hypothesis that best meets a given criteria is selected as the final hypothesis. In different systems, multiple hypotheses may be selected, signaled, and used.

With continued reference to FIG. 6, consider a case when a single motion model is used for the entire original source picture (605). After motion model parameters of the single motion model are calculated, picture warping (635) will be applied to the reconstructed reference picture (610) to obtain the processed reference picture (615) that will be used as a reference picture for subsequent motion model estimation.

Consider an alternative case when the reconstructed reference picture (610) has multiple regions with different motion models and/or parameters. The processed reference picture (1245) can be generated after consideration of each of the reconstructed reference picture's (610) motion models and parameters. To avoid discontinuities between neighboring regions, overlapping may also be considered. Regions can be overlapping and some pixels of the processed reference picture (1245) can be predicted using multiple motion models and motion model parameters.

As discussed earlier, overlapping portions of the regions may have different motion model and/or motion model parameters applied to them. For instance, with reference to FIG. 5, consider there is an overlap (510) portion between a bottom portion of a first region (500) and a top portion of a second region (505). Also consider that the different motion models are applied to the first and second regions (500, 505). A first set of predicted pixels for the overlap portion (510) is obtained from the motion model parameters of the first region (500). A second set of predicted pixels for the overlap portion (510) is obtained from the motion model parameters of the second region (505). Predicted pixels of the processed reference picture (615) for the overlap portion (510) can be generated by taking an average or a weighted average of the first set of predicted pixels and the second set of predicted pixels.

The resulting pixels, as obtained from averages or weighted averages of predictions for the overlapping regions, are referred to as the final pixels. Equivalently, these final pixels serve as information that will be utilized in predicting subsequent pictures. The weights applied in the weighted average can be signaled or automatically selected given a distance of each pixel from the center of each partition. As an alternative, deblocking may also be applied across region boundaries to avoid discontinuities, as discussed earlier.

Accurate motion model parameters can be estimated even for large motion fields. The warping process (635) is different for different motion models, and different regions in the original picture (605) may have different motion models and/or motion model parameters. Consequently, different coding efficiency exists between regions within a picture as well as between the encoder side and the decoder side. At the same time, efficiency can be significantly affected by accuracy of an interpolation filter used when applying the motion model parameters.

One way to improve coding efficiency is to use a simple interpolation filter, such as one that utilizes bilinear or pixel replication methods. However, more complex interpolation filters can also be used to improve coding efficiency. It may be desirable, apart from only signaling the motion model, to also signal different interpolation methods (630) to be used for each partition, as shown in FIG. 6. Each interpolation filter used in the various partitions in the reconstructed reference picture (610) can be designed to have different performance behavior. Evaluation of each interpolation filter's performance is generally performed prior to selecting the appropriate motion model for signaling and coding.

Selection of the motion model can be done through consideration of some objective or even subjective criterion. The objective criterion can be based on rate-distortion and computational complexity considerations. For instance, the motion model that is selected may be one that minimizes a defined cost. More in particular, the defined cost sought to be minimized may be the RD cost as defined in Equation (1).

In a particular embodiment that calculates RD costs by utilizing Lagrangian optimization, a brute force selection method can be performed. The brute force selection method would comprise evaluating and comparing all motion models. Evaluation of the motion models can potentially include consideration of all interpolation methods supported by the motion model. In the present example, the selected motion model will have the smallest RD cost.

However, the brute force selection method may be too slow. To speed up the motion model selection process, a fast selection approach such as a pruning evaluation method can be used. Specifically, for the pruning evaluation method, a supported group of a video coding system can be divided into subgroups. Consider that the supported group comprises the six motion models listed in Table 1. In a particular embodiment, five groups are defined, as given in the second column of Table 1. Groups are generally determined based on complexity of the motion models. For Table 1, the groups are grouped by the number of model parameters. Consequently, since the zoom motion model and the isotropic motion model each have four model parameters, they form one subgroup. Each of the other motion models in Table 1 is its own subgroup.

Figure 7:
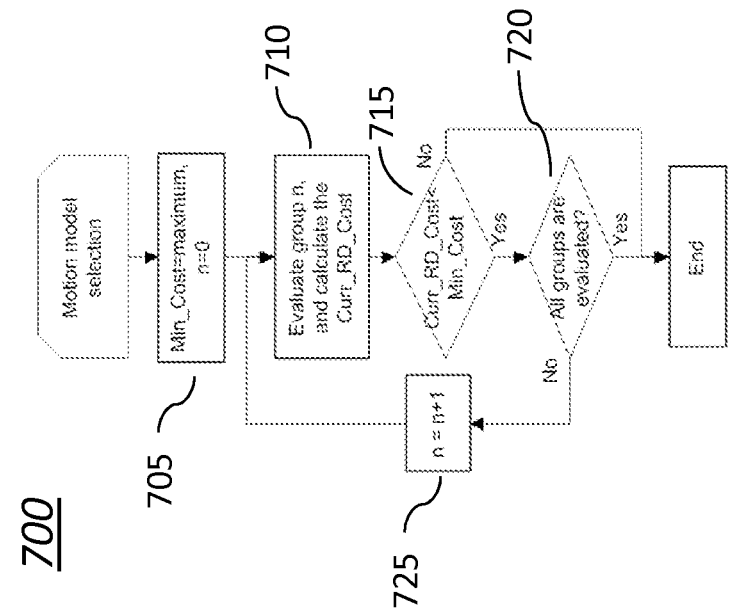
FIG. 7 shows an exemplary embodiment of a fast motion model selection process.

FIG. 7 shows an exemplary fast motion model selection algorithm (700). The selection algorithm (700) selects the motion model with the minimum RD cost. Evaluation of the RD cost begins with group 0 (705). A Min_Cost parameter is set to a maximum value that the video system can support. For example, if the system only supports 8-bit integers, the maximum value is 255. In a second step (710), the RD cost of group 0 is evaluated. In a third step (715), the RD cost of group 0 is compared with Min_Cost parameter. If the RD cost of group 0 is lower than the Min_Cost parameter, then a fourth step (720) checks to see if there are any more groups to evaluate. If more groups exist, a fifth step (725) places a next group, group 1 in this case, up for evaluation. The second through fifth steps (710, 715, 720, 725) are repeated until either all groups are evaluated or whenever the third step (715) determines that the current RD cost is not less than the Min_Cost parameter. For each group's evaluation, every motion model belonging to that group is evaluated. For the motion model selection algorithm (700) shown in FIG. 7, the motion and/or processing model with minimal RD cost will be selected.

FIG. 7 shows a fast motion model selection algorithm based on minimum RD cost. As discussed earlier, other coding criteria such as rate-distortion-complexity cost and bit overhead for motion model parameter signaling may also be used for selecting a motion and/or processing model.

Additional embodiments of the fast motion model selection algorithm (700) can consider previous reference pictures and neighboring spatial and/or temporal regions. Additionally, consideration of which motion models have already been considered for any particular region can also speed up the selection process (700) even further.

As an example, consider a neighboring region has selected model 0 and has similar motion parameters as a current region for the model. In this case, model 0 is likely to be an appropriate model for the current region. Consequently, model 0 can be selected immediately. Alternatively, evaluation can be restricted to those other motion models that are considered similar motion models. For instance, if the zoom model (group index 1 in Table 1) is the most likely motion model to use for the neighboring regions, then the isotropic model (also group index 1 in Table 1) would be considered a similar motion model.

Additionally, block-based motion parameters across neighboring regions can be compared. Such comparisons are used to determine degree of similarity between the regions, which yields information that can be used to speed up the selection process (700) even further.

In an additional embodiment, if all motion models in the different regions have the same or very similar motion model parameters, determination of the final motion model can be done immediately without any further refinements. Other methods, such as thresholding methods, can also be considered. Thresholding methods can consider, for instance, prediction distortion of a certain motion model and prediction distortion between neighboring regions. When differences in motion model parameters are small, similarity can be determined between multiple neighboring regions. Thresholding methods generally compute sum of absolute differences (SAD) or sum of square differences between the various motion model parameters.

Generally, motion model parameters can take any precision, including floating point precision. However, for purposes of coding, conversion of the derived motion model parameters to integer precision should be performed. In particular, an exemplary conversion from floating point precision to integer precision of any particular motion model parameter is given by Equation (8), as follows:

$$P_{int} = \text{Floor}(P_{float} * s + r) \quad (8)$$

where $P_{int}$ is the motion model parameter taking integer precision and $P_{float}$ is the motion model parameter taking floating point precision, s is a scaling factor that is known by the decoder, and r is a rounding offset. The Floor(x) operation selects the greatest integer less than or equal to x. The value of the scaling factor s may be different for the different motion model parameters.

The motion model parameters can be categorized into three groups, as listed in Table 3 below:

TABLE 3

Motion model parameter categorization

| Motion Model Index | Number of model parameters | $0^{th}$-order parameters | $1^{st}$-order parameters | $2^{nd}$-order parameters |
|---|---|---|---|---|
| 0 | 2 | $h_0^x, h_0^y$ | None | None |
| 1 | 4 | $h_0^x, h_0^y$ | $h_1^x, h_1^y$ | None |
| 2 | 4 | $h_0^x, h_0^y$ | $h_1^x, h_1^y$ | None |
| 3 | 6 | $h_0^x, h_0^y$ | $h_1^x, h_2^x, h_1^y, h_2^y$ | None |
| 4 | 8 | $h_0^x, h_0^y$ | $h_1^x, h_2^x, h_1^y, h_2^y$ | $h_3^x, h_3^y$ |
| 5 | 12 | $h_0^x, h_0^y$ | $h_1^x, h_2^x, h_1^y, h_2^y$ | $h_3^x, h_4^x, h_5^x, h_3^y, h_4^y, h_5^y$ |

Generally, higher order parameters require higher precision for accurate representation. Additionally, higher precision yields larger values for the scaling factor s.

Given that many partitions can have similar motion models, certain prediction methods can be utilized to provide additional compression benefits. For example, if multiple regions use the same motion model, a single motion model can be signaled from a higher level, outside the partitions, such that signaling within the partitions of this single motion model can be used instead of having to signal the same single model multiple times within the RPU.

The prediction process can be considered for the case of multiple motion models as well. In particular, a predictor derivation method that considers multiple motion models is listed in Table 4. For this method, prediction can use information from a single set of global motion model parameters or else signal all motion parameters without use of prediction information.

TABLE 4

Global motion model prediction if global motion model exists

| Predictor index | Predictor |
| --- | --- |
| 0 | None |
| 1 | Default motion (zero motion) |

On the other hand, simpler prediction methods can be considered by utilizing some or all neighboring partitions. The prediction method can, for example, use a median approach, such as the median approach used in MPEG-4 AVC, to derive the motion model parameters used for prediction. Alternatively, the prediction method can consider only neighboring partitions that utilize the same motion models. If different models are combined, then conversion of different motion models to the currently considered motion model is generally performed before considering use of its motion vectors for prediction.

In an alternative embodiment, a more comprehensive approach that enables signaling of a predictor position, instead of the predictor position being implied or derived from neighboring partitions, can be used. Such a method is shown below in Table 5 and Table 6.

TABLE 5

Motion model prediction of partitions if global motion model exists

| Predictor index | Predictor |
| --- | --- |
| 0 | None |
| 1 | Global motion |
| 2 | Left partition |
| 3 | Top partition |
| 4 | Top left partition |
| 5 | Top right partition |
| Others | Partition_Idx = Current_Partition_Idx − (predictor_index − 5) |

TABLE 6

Motion model prediction of partitions if global motion model does not exist

| Predictor index | Predictor |
| --- | --- |
| 0 | None |
| 1 | Left partition |
| 2 | Top partition |

TABLE 6-continued

Motion model prediction of partitions if global motion model does not exist

| Predictor index | Predictor |
| --- | --- |
| 3 | Top left partition |
| 4 | Top right partition |
| Others | Partition_Idx = Current_Partition_Idx − (predictor_index − 4) |

Table 5 assumes the presence of a single global motion model. However, motion model prediction of partitions can be extended to support multiple global motion models signaled prior to signaling the partitions.

Alternatively, Table 6 considers motion model prediction of partitions without any global motion model parameters. A combination of implied and explicitly specified methods can also be used. Implied methods for any particular partition could be based, for instance, on a prediction process based on information from neighboring partitions. For instance, if the neighboring partitions of the particular partition all use the affine motion model and all have the same parameters, then the likelihood of the particular partition also using the same motion model and the same parameters are high. Consequently, in this simplified example, the particular partition would very likely use the affine motion model and the same parameters as those of the neighboring partitions.

Furthermore, prediction results can imply that the entire motion vector is predicted correctly without signaling any additional refinement information. This occurs, for instance, when cost criteria of a motion estimation process are met. Even in such a case, additional refinement information may optionally be signaled. This refinement information can be added onto the predicted motion model similar to the process defined in Equation (9) as shown below. Note that prediction can also significantly affect decoding parallelization of each RPU region and may have to be considered in the design of a system using such techniques.

$$\vec{M}_{int} = \text{Scale\_Down}(\text{Scale\_Up}(\vec{P}_{int}) + \vec{r}_{int}) \quad (9)$$

where vector $\vec{M}_{int}$ is the decoded motion model parameters, vector $\vec{P}_{int}$ is the predicted motion model parameters, and $\vec{r}_{int}$ vector is the encoded residuals. All of the parameters are generally of fixed point precision. The Scale_Down and Scale_Up functions are the scaling functions used in the conversion.

Consider the scaling factor s, as shown in Equation (8). Three possible signaling methods of the scaling factor are discussed. The scaling factor may be implied and fixed for the entire coding process; in other words, the scaling factor can be signaled for all partitions. The scaling factor can be signaled (or not signaled) based on information from neighboring partitions. As a first example, if the scaling factor is determined to be the same for all partitions, the scaling factor need only be signaled once. Alternatively, difference between scaling factors of the particular partition and those of the neighboring partitions may be signaled. The scaling factor can also be signaled depending on a flag specified for each region. For instance, if a flag is set to 1, then the scaling factor is signaled. Otherwise, the scaling factor is not signaled and the decoder will use the default value.

C. Interpolation Filtering

Following motion warping, various interpolation filters may be used to obtain a pixel value at fractional positions. Interpolation filtering method used to obtain pixel values at fractional positions can be indicated as part of signaling of the motion model parameters. By way of example and not of limitation, any of the six interpolation filters specified in Table 7, shown below, can be used to obtain the pixel value at fractional positions.

TABLE 7

Interpolation filter

| Index | Filter | Number of filter tabs |
|---|---|---|
| 0 | Bilinear | 2 |
| 1 | Lanczos-2 | 4 |
| 2 | Bicubic | 4 |
| 3 | Mitchell-Netravali | 4 |
| 4 | Lanczos-3 | 6 |
| 5 | Explicit filter | 4 or 6 |

In the case of an explicit filter (filter index 5 in Table 7), filter coefficients may need to be sent as part of a bitstream to the decoder. Similar to the signaling of the motion model parameters, the filter coefficients can also be predicted. For instance, prediction of filter coefficients can be achieved through a signaling process or through previously coded partitions regardless of whether the motion models of the previously coded partitions and the current partition are similar or different.

All the other filters Table 7 (filter index 0-4) are fixed filters, also called implicit filters. For fixed filters, the filter coefficients are pre-determined and thus only the filter index needs to be signaled to the decoder. The decoder would then be able to determine the coefficients by, for instance, using a look-up table. With fixed filters, if coefficient quantization does not occur, then the fixed filters coefficients may be of floating point precision. Use of floating point precision requires corresponding use of floating point precision processing.

Alternatively, in another embodiment of the interpolation filter, the filter coefficients can be quantized to have fixed-point precision. Fixed-point precision generally reduces implementation complexity. Additionally, fixed-point precision eliminates possibility of drift. Drift is an effect of getting different results from using different platforms (such as different operating systems). Drift may be due to use of different precision floating number representations (for example, numbers with different mantissa and exponent size) and arithmetic on different platforms.

In yet another embodiment, filter coefficients can be quantized such that 16-bit arithmetic can be used. For example, the filter coefficients can be quantized for each filter (filter index 1-4) as shown in Table 8 through Table 11 as follows. Note that the bilinear filter coefficients (filter index 0) do not need to be quantized beforehand, since the bilinear filter coefficients can be easily calculated with fixed-point precision on the fly. The filters as shown in Table 8 through Table 11 allow use of 16-bit arithmetic for 8-bit input video signals. The quantized filter coefficients can only perform interpolation up to $\frac{1}{32}$ pixel precision. However, when the motion warping process performed by the interpolation filter uses pixel precision higher than $\frac{1}{32}$, a second-stage bilinear filter or any other filter may be used to obtain a value at a higher pixel precision.

TABLE 8

Interpolation filter coefficients for Lanczos-2 filter (filter index 1) with $\frac{1}{32}$-pixel precision

| Position index | Coeff_0 | Coeff_1 | Coeff_2 | Coeff_3 |
|---|---|---|---|---|
| 0 | 0 | 64 | 0 | 0 |
| 1 | −1 | 64 | 1 | 0 |
| 2 | −2 | 63 | 3 | 0 |
| 3 | −3 | 63 | 4 | 0 |
| 4 | −4 | 62 | 6 | 0 |
| 5 | −4 | 61 | 8 | −1 |
| 6 | −5 | 60 | 10 | −1 |
| 7 | −5 | 58 | 12 | −1 |
| 8 | −6 | 56 | 15 | −1 |
| 9 | −6 | 54 | 17 | −1 |
| 10 | −6 | 52 | 20 | −2 |
| 11 | −5 | 49 | 22 | −2 |
| 12 | −5 | 47 | 25 | −3 |
| 13 | −5 | 44 | 28 | −3 |
| 14 | −5 | 42 | 31 | −4 |
| 15 | −4 | 39 | 33 | −4 |
| 16 | −4 | 36 | 36 | −4 |
| 17 | −4 | 33 | 39 | −4 |
| 18 | −4 | 31 | 42 | −5 |
| 19 | −3 | 28 | 44 | −5 |
| 20 | −3 | 25 | 47 | −5 |
| 21 | −2 | 22 | 49 | −5 |
| 22 | −2 | 20 | 52 | −6 |
| 23 | −1 | 17 | 54 | −6 |
| 24 | −1 | 15 | 56 | −6 |
| 25 | −1 | 12 | 58 | −5 |
| 26 | −1 | 10 | 60 | −5 |
| 27 | −1 | 8 | 61 | −4 |
| 28 | 0 | 6 | 62 | −4 |
| 29 | 0 | 4 | 63 | −3 |
| 30 | 0 | 3 | 63 | −2 |
| 31 | 0 | 1 | 64 | −1 |

TABLE 9

Interpolation filter coefficients for bicubic filter (filter index 2) with $\frac{1}{32}$-pixel precision

| Position index | Coeff_0 | Coeff_1 | Coeff_2 | Coeff_3 |
|---|---|---|---|---|
| 0 | 0 | 64 | 0 | 0 |
| 1 | −1 | 64 | 1 | 0 |
| 2 | −2 | 63 | 3 | 0 |
| 3 | −2 | 62 | 4 | 0 |
| 4 | −3 | 61 | 6 | 0 |
| 5 | −3 | 60 | 8 | −1 |
| 6 | −4 | 59 | 10 | −1 |
| 7 | −4 | 57 | 12 | −1 |
| 8 | −5 | 56 | 15 | −2 |
| 9 | −5 | 54 | 17 | −2 |
| 10 | −5 | 51 | 20 | −2 |
| 11 | −5 | 49 | 22 | −2 |
| 12 | −5 | 47 | 25 | −3 |
| 13 | −5 | 44 | 28 | −3 |
| 14 | −4 | 41 | 30 | −3 |
| 15 | −4 | 39 | 33 | −4 |
| 16 | −4 | 36 | 36 | −4 |
| 17 | −4 | 33 | 39 | −4 |
| 18 | −3 | 30 | 41 | −4 |
| 19 | −3 | 28 | 44 | −5 |
| 20 | −3 | 25 | 47 | −5 |
| 21 | −2 | 22 | 49 | −5 |
| 22 | −2 | 20 | 51 | −5 |
| 23 | −2 | 17 | 54 | −5 |
| 24 | −2 | 15 | 56 | −5 |
| 25 | −1 | 12 | 57 | −4 |
| 26 | −1 | 10 | 59 | −4 |
| 27 | −1 | 8 | 60 | −3 |

TABLE 9-continued

Interpolation filter coefficients for bicubic filter (filter index 2) with 1/32-pixel precision

| Position index | Coeff_0 | Coeff_1 | Coeff_2 | Coeff_3 |
|---|---|---|---|---|
| 28 | 0 | 6 | 61 | −3 |
| 29 | 0 | 4 | 62 | −2 |
| 30 | 0 | 3 | 63 | −2 |
| 31 | 0 | 1 | 64 | −1 |

TABLE 10

Interpolation filter coefficients for Mitchell-Netravali filter (filter index 3) with 1/32-pixel precision

| Position index | Coeff_0 | Coeff_1 | Coeff_2 | Coeff_3 |
|---|---|---|---|---|
| 0 | 4 | 56 | 4 | 0 |
| 1 | 3 | 56 | 5 | 0 |
| 2 | 2 | 56 | 6 | 0 |
| 3 | 1 | 56 | 7 | 0 |
| 4 | 0 | 55 | 9 | 0 |
| 5 | 0 | 54 | 10 | 0 |
| 6 | −1 | 53 | 13 | −1 |
| 7 | −1 | 52 | 14 | −1 |
| 8 | −2 | 50 | 17 | −1 |
| 9 | −2 | 48 | 19 | −1 |

TABLE 10-continued

Interpolation filter coefficients for Mitchell-Netravali filter (filter index 3) with 1/32-pixel precision

| Position index | Coeff_0 | Coeff_1 | Coeff_2 | Coeff_3 |
|---|---|---|---|---|
| 10 | −2 | 47 | 20 | −1 |
| 11 | −2 | 45 | 23 | −2 |
| 12 | −2 | 43 | 25 | −2 |
| 13 | −2 | 41 | 27 | −2 |
| 14 | −2 | 38 | 30 | −2 |
| 15 | −2 | 36 | 32 | −2 |
| 16 | −2 | 34 | 34 | −2 |
| 17 | −2 | 32 | 36 | −2 |
| 18 | −2 | 30 | 38 | −2 |
| 19 | −2 | 27 | 41 | −2 |
| 20 | −2 | 25 | 43 | −2 |
| 21 | −2 | 23 | 45 | −2 |
| 22 | −1 | 20 | 47 | −2 |
| 23 | −1 | 19 | 48 | −2 |
| 24 | −1 | 17 | 50 | −2 |
| 25 | −1 | 14 | 52 | −1 |
| 26 | −1 | 13 | 53 | −1 |
| 27 | 0 | 10 | 54 | 0 |
| 28 | 0 | 9 | 55 | 0 |
| 29 | 0 | 7 | 56 | 1 |
| 30 | 0 | 6 | 56 | 2 |
| 31 | 0 | 5 | 56 | 3 |

TABLE 11

Interpolation filter coefficients for Lanczos-3 filter (filter index 4) with 1/32 pixel precision

| Position index | Coeff_0 | Coeff_1 | Coeff_2 | Coeff_3 | Coeff_4 | Coeff_5 |
|---|---|---|---|---|---|---|
| 0 | 0 | 0 | 64 | 0 | 0 | 0 |
| 1 | 0 | −2 | 64 | 2 | 0 | 0 |
| 2 | 1 | −3 | 63 | 4 | −1 | 0 |
| 3 | 1 | −4 | 63 | 5 | −1 | 0 |
| 4 | 1 | −5 | 62 | 8 | −2 | 0 |
| 5 | 2 | −6 | 61 | 10 | −3 | 0 |
| 6 | 2 | −7 | 60 | 12 | −3 | 0 |
| 7 | 2 | −8 | 59 | 15 | −4 | 0 |
| 8 | 2 | −9 | 57 | 17 | −4 | 1 |
| 9 | 2 | −9 | 55 | 20 | −5 | 1 |
| 10 | 2 | −9 | 53 | 23 | −6 | 1 |
| 11 | 2 | −9 | 51 | 25 | −6 | 1 |
| 12 | 2 | −9 | 49 | 28 | −7 | 1 |
| 13 | 2 | −9 | 46 | 31 | −7 | 1 |
| 14 | 2 | −9 | 44 | 34 | −8 | 1 |
| 15 | 2 | −9 | 42 | 36 | −8 | 1 |
| 16 | 2 | −9 | 39 | 39 | −9 | 2 |
| 17 | 1 | −8 | 36 | 42 | −9 | 2 |
| 18 | 1 | −8 | 34 | 44 | −9 | 2 |
| 19 | 1 | −7 | 31 | 46 | −9 | 2 |
| 20 | 1 | −7 | 28 | 49 | −9 | 2 |
| 21 | 1 | −6 | 25 | 51 | −9 | 2 |
| 22 | 1 | −6 | 23 | 53 | −9 | 2 |
| 23 | 1 | −5 | 20 | 55 | −9 | 2 |
| 24 | 1 | −6 | 17 | 57 | −9 | 2 |
| 25 | 0 | −4 | 15 | 59 | −8 | 2 |
| 26 | 0 | −3 | 12 | 60 | −7 | 2 |
| 27 | 0 | −3 | 10 | 61 | −6 | 2 |
| 28 | 0 | −2 | 8 | 62 | −5 | 1 |
| 29 | 0 | −1 | 5 | 63 | −4 | 1 |
| 30 | 0 | −1 | 4 | 63 | −3 | 1 |
| 31 | 0 | 0 | 2 | 64 | −2 | 0 |

Note that interpolation filters may consider non-linear interpolation mechanisms. Non-linear interpolation may be achieved through techniques such as wavelet or bandlet based interpolation, motion-compensated temporal filtering (MCTF) based interpolation, and so forth.

Different interpolation filters and/or interpolation mechanisms can be used for chroma samples and luma samples. Luma samples contain information concerning brightness of a picture; in other words, luma samples deal with achromatic information of the picture. In contrast, chroma samples contain color information of the picture.

Interpolation filters are generally selected based on a particular criterion or multiple criteria. Such criteria may include requirements on distortion, rate-distortion, distortion-complexity, joint rate-distortion-complexity, and so forth, as discussed earlier.

Figure 8:
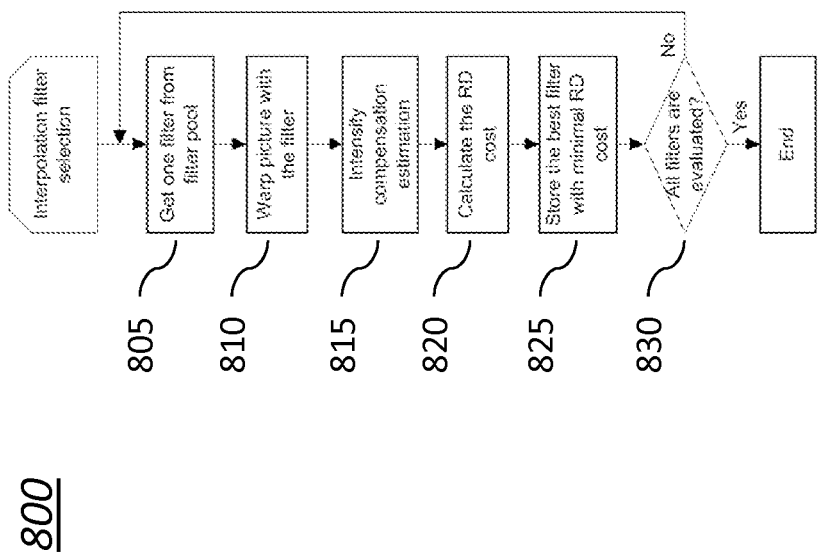
FIG. 8 shows an exemplary embodiment of an interpolation filter selection and intensity compensation estimation process.

FIG. 8 shows an exemplary joint interpolation filter selection and intensity compensation estimation process (800). This exemplary selection process (800) estimates intensity information and selects an interpolation filter, from a filter pool, with the lowest RD cost. A first step (805) comprises choosing a current interpolation filter from the filter pool. A second step (810) comprises warping a reference picture with the interpolation filter of the first step (805). A third step (815) comprises intensity compensation estimation for use in calculation of the RD cost. A fourth step (820) comprises calculating the RD cost. A fifth step (825) comprises comparing the RD cost of the current filter with the minimum RD cost of all the interpolation filters evaluated thus far. If the current filter has a lower RD cost than the current minimum RD cost, the minimum RD cost is set to the RD cost of the current filter. A sixth step (830) comprises determining whether all interpolation filters from the filter pool have been evaluated. If not, the second step (810) through the sixth step (830) are repeated for a next interpolation filter. Once all the interpolation filters have been evaluated, the interpolation filter with the lowest RD cost is selected.

As was the case for the fast motion model selection algorithm (700) shown in FIG. 7, the interpolation filter selection algorithm (800) shown in FIG. 8 also utilizes RD cost as its criterion. The criterion of utilizing RD cost is only used as an example and a person of ordinary skill in the art knows that other pre-defined coding criteria may be used as well. Such criteria include rate-distortion-complexity cost and bit overhead for motion model parameter signaling may also be used for selecting a motion model.

For filters with filter index 0-4, as categorized in Table 7, filter coefficients are predefined and thus only a filter index needs to be signaled to the decoder. For the explicit filter (filter index 5), filter coefficients need to be estimated. For example, the filter coefficients of the explicit filter may be estimated based on motion model parameters by using a least square estimator. These filter coefficients are then signaled to the decoder. Other methods can also be used to speed up the filter selection process. For instance, FIG. 8, as just discussed, interpolation filter selection and intensity compensation estimation was performed within the same process. Alternatively, interpolation filter selection and intensity compensation estimation could be performed in separate processes. Additionally, iteration between the selection process of FIG. 8 and motion model parameter estimation process may also be implemented.

Consider an embodiment of fixed filter signaling. Specifically, consider a first fixed filter that performs interpolation up to a first pixel precision level and a second fixed filter that performs interpolation for remaining pixel precision levels higher than the first pixel precision level. A first pixel index corresponding to the first fixed filter can be signaled for all pixel precision levels up to the first pixel precision level. A second pixel index corresponding to the second fixed filter can be signaled for the remaining pixel precision levels higher than the first pixel precision level.

Some methods can consider neighboring partitions, either neighboring spatial partitions or neighboring temporal partitions. As an example, the encoder can test a particular interpolation filter at the global level and multiple interpolation filters at the region level. The encoder can then select whether to utilize the global or region level interpolation filtering based on predefined criteria such as rate-distortion cost or rate-distortion-complexity cost. Additionally, some methods can include early termination, where a particular method can, for instance, include consideration of a "complexity" budget. The complexity budget may be defined by the encoder, where the encoder could simplify or end an optimization process that becomes overly complex. The encoder may also consider decoding complexity when performing an optimization process.

Additionally, explicit filters may or may not yield better performance because of additional overhead for filter coefficient signaling. Generally, the encoder generates a decision on whether to use explicit or fixed filters based on a selection process, such as that given in FIG. 8.

C.1 Explicit Filter Signaling

When explicit interpolation filters (filter index 5 in Table 7) are used, filter coefficient signaling may incur high bit overhead. For this reason, certain types of pixel symmetry and coefficient symmetry are commonly used to reduce number of unique filter coefficients that need to be signaled.

An exemplary reference that deals with using pixel and coefficient symmetry to reduce number of unique filter coefficients is U.S. Provisional Application No. 61/295,034, entitled "Buffered Adaptive Filters", filed on Jan. 14, 2010. This reference is incorporated herein by reference in its entirety.

Figures 9, 10:
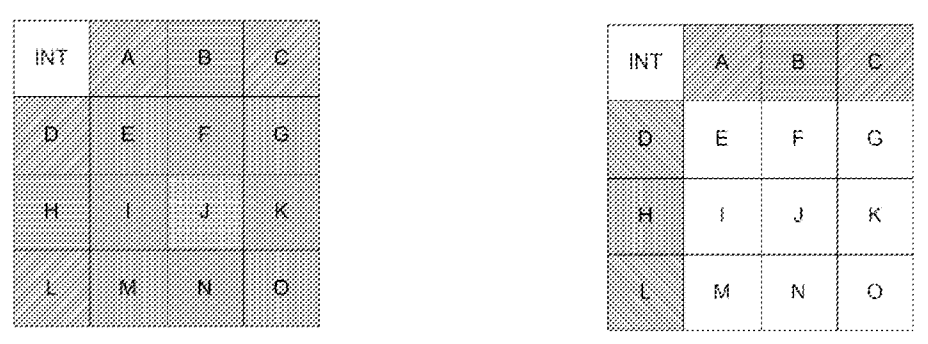

FIG. 9 shows a first example of pixel symmetry. In particular, FIG. 9 utilizes ¼ pixel precision and thus shows fifteen fractional pixel positions, labeled pixels "A" through "O", and a full-pixel position, labeled "INT". In FIG. 9, assume that fractional pixel positions that share a same shaded pattern will also share a same set of filter coefficients; however, their interpolation filters are transposed and/or flipped versions of each other. Therefore, using pixel symmetry as shown in FIG. 9, interpolation filters for only five out of the fifteen pixel positions need to be signaled. In particular, fractional pixels "A", "C", "D", and "L" share a first set of filter coefficients, "B" and "H" share a second set of filter coefficients, "E" "G", "M" and "O" share a third set of filter coefficients, and "J" has a fourth set of filter coefficients. Consequently, by using pixel symmetry, the number of filter coefficients is reduced and thus the bit overhead for filter coefficient signaling is reduced.

FIG. 10 shows a second example of pixel symmetry. Only horizontal interpolation filters for the fractional positions "A" and "B" and vertical interpolation filters for the fractional positions "D" and "H" are signaled. Fractional positions "C" and "L" share the same set of filter coefficients as fractional positions "A" and "D", respectively. Each of 2D pixel positions (namely "E", "F", "G", "I", "J", "K", "M", "N", and "O") is interpolated using a horizontal interpolation filter first and then filtering vertical interpolation filter (or vice versa) To further reduce bit overhead for filter coefficient signaling, the horizontal interpolation filters and the vertical interpolation filters may be forced to share the same set of filter coefficients such that "A", "C", "D", and "L" share one set of filter coefficients, and "B" and "H" share another set of filter coefficients).

More specifically, consider the pixel symmetry for fractional positions "A", "C", and "D". By exploiting pixel symmetry, fractional positions "A" and "C" may share the same set of filter coefficients, but their filters are transposed versions of each other (a rotation of 180°). Fractional positions "A" and "D" also share the same coefficients, but the filter for "A" is applied horizontally and that for "D" is applied vertically and thus the filter of "D" exhibits a 90° relative to the filter of "A". Although the interpolation filters themselves are not identical between any of the fractional positions "A", "C", and "D", signaling of the filter coefficients of any of these fractional positions is sufficient because the interpolation filter of any one of these fractional positions can be used to derive the interpolation filters of the other two. Consequently, bit overhead savings result from the use of pixel symmetry. The other symmetries previously listed may also be utilized to achieve bit overhead savings.

FIG. 9 and FIG. 10 are simply two examples of pixel symmetry. Other types of pixel symmetry may also be used to reduce filter coefficient signaling overhead. The encoder may choose an optimal pixel symmetry and signal the pixel symmetry, as part of the RPU payload, to the decoder. In addition to pixel symmetry of a reference picture, other symmetries, such as coefficient symmetry may also be imposed to further reduce filter signaling overhead. For example, the interpolation filters for pixel position "B" and "H" may be symmetric filters.

During a motion warping process performed by the interpolation filter, higher fractional pixel precision is generally used. Higher fractional pixel precision leads to better quality for the warped reference picture. However, higher fractional pixel precision also leads to a larger number of filters that require signaling, resulting in high bit overhead. Even when a certain type of pixel symmetry is enforced, bit overhead can still increase substantially as pixel precision increases.

Consider a first example using the pixel symmetry in FIG. 9, wherein ¼ pixel precision is used and five interpolation filters need to be signaled, as previously discussed Consider instead that $½^m$ pixel precision is used instead of ¼ pixel precision. The number of interpolation filters that need to be signaled will be $(2^{m-2}+1)(2^{m-1}+1)-1$, which means that 152 filters need to be signaled if 1/32 pixel precision (m=5) is used.

Consider a second example using the pixel symmetry in FIG. 10, wherein ¼ pixel precision is used and four interpolation filters need to be signaled, as previously discussed. Consider instead that $½^m$ pixel precision is used. The number of interpolation filters that need to be signaled will be $2^m$ if horizontal and vertical interpolation filters are allowed to be different, and $2^{m-1}$ if horizontal and vertical interpolation filters are forced to be the same. To address the problem of having to signal too many filters, explicit filters may be signaled up to only a certain precision $½^n$, n≤m, where m is a parameter chosen by the encoder based on criteria such as rate distortion cost. For any precision higher than $½^n$, fixed interpolation filters (filters of index 0 through 4 in Table 7) may be used.

Figure 11:
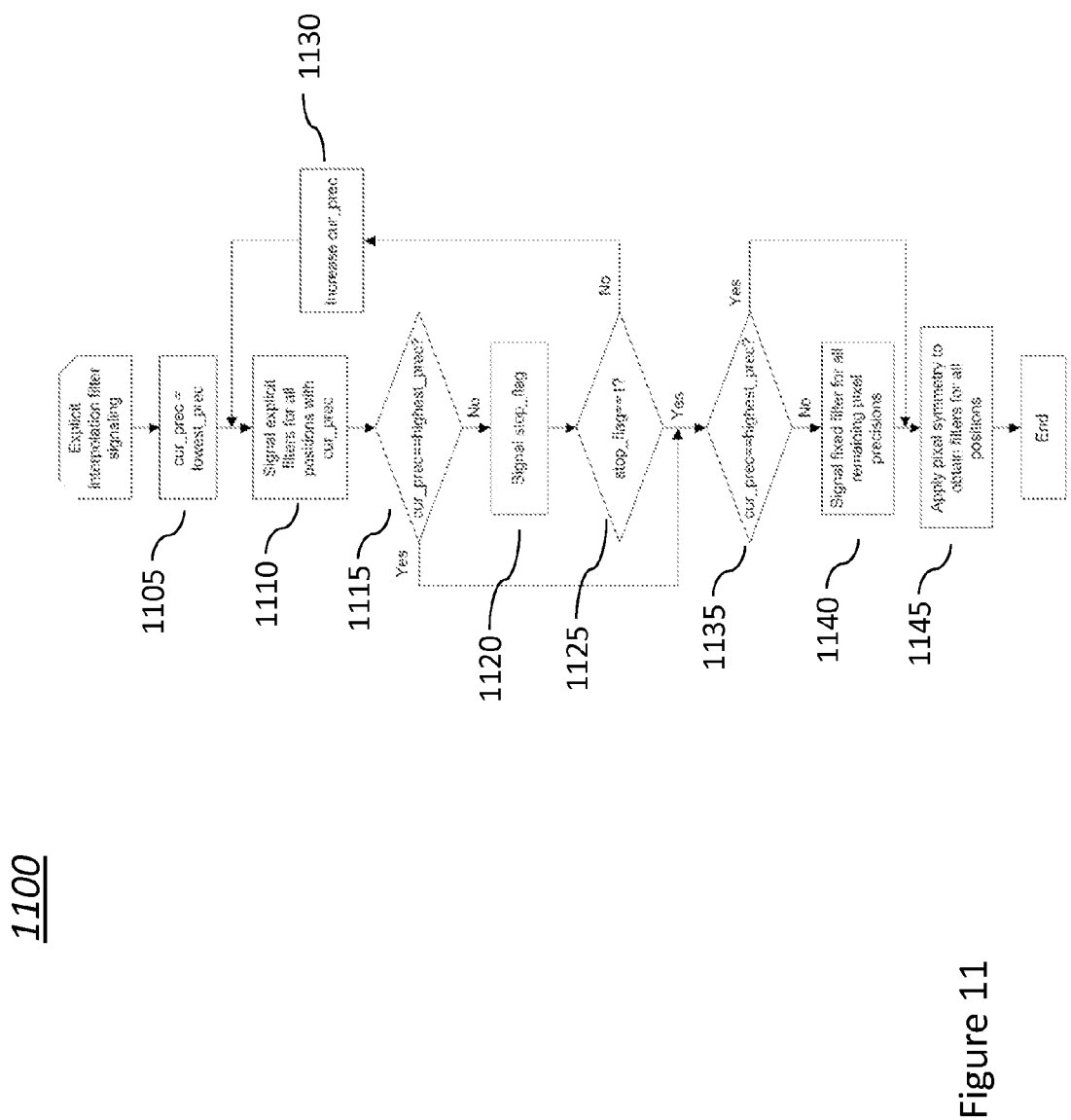
FIG. 11 shows an embodiment of a process for signaling explicit interpolation filters.

For example, FIG. 11 describes an embodiment of explicit filter signaling (1100). The process in FIG. 11 starts from the lowest interpolation precision (1105), which is generally ½ pixel precision. After all explicit filters have been signaled for the current precision (1110), the process determines if all precisions have been signaled (1115). If the decision of block 1115 is yes, then no further interpolation filters need to be signaled. Otherwise, if the decision of 1115 is no, then a one-bit flag, shown as "stop_flag" in FIG. 11, is signaled (1120) to indicate if further signaling of explicit filters will follow. If the value of "stop_flag" is 1 (1125), then no more explicit filters will be signaled. Otherwise, if the value of "stop_flag" is 0 (1125), then the current pixel precision is incremented (1130), and further signaling of explicit interpolation filters continues (blocks 1110, 1115, 1120, and 1125 are repeated).

After all explicit filters have been signaled, the process determines if explicit filters for all precision levels have been signaled (1135). If the decision of block 1135 is yes, then no further signaling is needed. Otherwise, if the decision of block 1135 is no, then the process will signal one fixed filter index for all remaining precision levels (block 1140); the corresponding interpolation filters for all these remaining precision levels may be inferred from this filter index. Finally, the type of pixel symmetry used (previous signaled, not shown in FIG. 11) may be applied to obtain interpolation filters for all pixel positions at all precision levels (1145).

D. Intensity Compensation

Although the motion models presented in Table 1 can provide accurate information about motion that may be present within a region with the reference picture, motion models generally do not provide much information about intensity changes, in particular brightness and contrast changes, that may be present within a scene. Therefore, combining motion model parameters with an additional intensity compensation model can provide further improvements in coding efficiency within a multi-view, scalable, or 2D codec system. Intensity compensation requires derivation of a set of intensity compensation parameters prior to signaling of the intensity compensation parameters. The intensity compensation parameters can be derived through a variety of methods such as histogram matching, least square estimation, DC subtraction, and ratio consideration. Different intensity compensation parameters can be derived from luma and chroma components. Alternatively, derivation of the intensity compensation parameters can be based on one component whereas the others can be derived through simple projection methods. For instance, some intensity compensation parameters can be derived based on luma components only. The remaining intensity compensation parameters, namely those generally obtained from chroma components, can be estimated using information from the parameters derived from the luma components.

Intensity compensation applied to the reference picture can be represented using a variety of methods, including non-linear methods such as those used in high dynamic range applications. In a certain embodiment, intensity compensation can use, for simplicity, a linear format as shown in Equation (10) below:

$$I'=w*I+o \qquad (10)$$

where I' is a final pixel after intensity compensation, I is an original pixel before intensity compensation, w is a parameter indicating a weight of the intensity compensation, and o is an offset of the intensity compensation.

Parameters w and o are generally quantized prior to use in coding. The final pixel I' may also need to be constrained according to a required precision of the pixel value. Intensity parameters are commonly represented in integer form or fixed-point form to simplify the encoding process and the computation process. Consequently, scaling factors w and o may be converted from floating point precision to integer precision or fixed point precision. Such conversions were defined previously in Equation (8).

Intensity compensation parameter estimation can be based on original pictures, without any motion consideration, as well as motion aligned/compensated pictures. The intensity compensation parameter estimation can be improved if based on motion alignment/compensation.

Additionally, iterative methods can be utilized for intensity compensation parameter estimation. An exemplary iterative method is given as follows. After deriving preliminary motion model parameters, initial intensity compensation parameters can be derived from the preliminary motion model parameters. Given these initial intensity compensation parameters, the preliminary motion model parameters can be refined. In other words, by utilizing the intensity parameters, all motion model parameters can be re-estimated, thus yielding a second set of motion model parameters. Using the second motion model parameters, a second refinement of the intensity compensation parameters can follow. The iterative process can be repeated until negligible changes in the motion model parameters and the intensity parameters are observed. Alternatively, the iterative process can be repeated until performance of the intensity compensation is sufficient for a particular application. As another alternative, the iterative process can be repeated for a predefined number of iterations.

Detection of fades and cross-fades can also be considered to speed up the iterative process. For instance, a simplified method could be used such that if no fade or cross-fade is detected in the reference picture, then detection of intensity parameters can be skipped altogether. On the other hand, if a fade or a cross-fade is detected, then the encoder can additionally perform an estimation of illumination parameters and signal them to the decoder in the case that the estimation is beneficial to the encoding process.

As mentioned earlier, intensity parameters can be optional within an RPU. Signaling of intensity parameters can be based on a flag used to signal each region. Alternatively, signaling of intensity parameters can also be based on whether any or all neighboring partitions also signal intensity parameters. In other words, the neighboring partitions can be utilized in a neighborhood based prediction process. The neighborhood based prediction process can, for example, use a majority vote where the intensity parameters in neighboring partitions would be used to determine whether these same intensity parameters are signaled for a particular region. That is, if all or most neighboring partitions use the same intensity parameters, then those same intensity parameters are used for prediction. Coding of the intensity parameters can also be based on the values of intensity parameters of neighboring parameters. Coding can also consider global prediction methods, similar to the case of the motion prediction models discussed earlier. Different flags can also be signaled for the offset o and the weight w or for different color components, as suggested earlier.

In a case where no intensity parameters are signaled in the bitstream, a default set of intensity parameters is used. For generating new reference pictures at both the encoder and the decoder, the intensity compensation can be performed according to equation (11), shown below:

$$I'=\text{Floor}(((w_{int}*I)*s_o+o_{int}*s_w+r)/(s_w*s_o)) \quad (11)$$

where r is a rounding offset, $w_{int}$ and $o_{int}$ are intensity parameters (in particular, weight and offset parameters, respectively) with integer precision as decoded from the bitstream, and $s_w$ and $s_o$ are scaling factors for the weight and offset parameters, respectively. Equation (11) is equivalent to Equation (10) except that Equation (11) applies scaling factors $s_w$ and $s_o$ to the illumination parameters.

E. Denoising Filter

As a last step for an exemplary embodiment of reference processing, a denoising filter, also commonly referred to as an artifact reducing filter, may be applied to the motion compensated image to further improve quality of the processed reference picture. The denoising filter may be used to further reduce noise and artifacts introduced during coding and/or warping processes as well as noise and artifacts that may have been present in the original source. By further reducing noise and artifacts, the denoising filter further improves quality of the reference picture and thus improves the reference picture's functioning as a prediction signal.

In many embodiments, the denoising filter may be obtained using a least square estimator, or any other optimization process, at the encoder side. The resulting denoising filter may be signaled to the decoder using appropriate syntax within the RPU.

As mentioned earlier, FIG. 12 depicts a block diagram of the decoder side. In particular, FIG. 12 shows various components inside the RPU on the decoder side. When the denoising filter is used inside the RPU, the encoder may jointly optimize the denoising filter together with the other components such as motion model and corresponding motion model parameters, interpolation filter, intensity compensation, and so forth in the RPU. In other words, the encoder may consider denoising filter optimization inside the selection loop shown in FIG. 8.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

Thus, an embodiment of the present invention may relate to one or more of the example embodiments described below.

Accordingly, the invention may be embodied in any of the forms described herein, including, but not limited to the following Enumerated Example Embodiments (EEEs) which described structure, features, and functionality of some portions of the present invention:

EEE1. A method for processing a reference picture, comprising:
  i) performing motion estimation on an original picture to be encoded, based on a reconstructed reference picture, and a processed reference picture estimate;
  ii) further processing the motion estimated picture to obtain a further processed reference picture estimate; and
  iterating the motion estimation and the further processing to provide a processed reference picture.

EEE2. The method of enumerated example embodiment 1, wherein the further processing comprises further motion estimation to obtain motion model parameters and estimating at least one of interpolation filter parameters, intensity compensation parameters, and denoising filter parameters, and applying the motion model parameters and the at least one of interpolation filter parameters, intensity compensation parameters, and denoising filter parameters to the reconstructed reference picture.

EEE3. An iterative method for estimating motion parameters of a reconstructed reference picture or a region of the reconstructed reference picture of a reference picture buffer when performing reference picture processing in a single-layered or multi-layered video coding system, the method comprising:

i) performing motion estimation based on an original picture to be encoded and the reconstructed reference picture or a region of the reconstructed reference picture of the reference picture buffer;

ii) performing a further motion estimation to provide motion model parameters; and iii) performing warping according to the motion model parameters to obtain a warped picture; and iterating i)-iii), wherein the motion estimation of i) in subsequent iterations is based on the original picture to be encoded, the reconstructed reference picture or a region of the reconstructed reference picture of the reference picture buffer, and the warped picture.

EEE4. An iterative method for estimating motion parameters of a reconstructed reference picture or a region of the reconstructed reference picture of a reference picture buffer when performing reference picture processing in a single-layered or multi-layered video coding system, the method comprising:

i) performing motion estimation based on an original picture to be encoded and the reconstructed reference picture or a region of the reconstructed reference picture of the reference picture buffer;

ii) performing a further motion estimation to provide motion model parameters;

iii) processing the motion model parameters to provide at least one of interpolation filter parameters and intensity compensation parameters;

iv) performing warping according to the motion model parameters and the at least one of interpolation filter parameters and intensity compensation parameters to obtain a warped picture; and iterating i)-iv), wherein the motion estimation of i) in subsequent iterations is based on the original picture to be encoded, the reconstructed reference picture or a region of the reconstructed reference picture of the reference picture buffer, and the warped picture.

EEE5. The method of enumerated example embodiment 3, further comprising, before iteration, iv) filtering the warped picture to obtain a processed reference picture, wherein said iterating also iterates iv), thus iterating i)-iv), wherein the motion estimation of i) in subsequent iterations is based on the original picture to be encoded, the reconstructed reference picture or a region of the reconstructed reference picture of the reference picture buffer, and the processed reference picture.

EEE6. The method of enumerated example embodiment 4, further comprising, before iteration, v) filtering the warped picture to obtain the processed reference picture, wherein said iterating also iterates iv) and v), thus iterating i)-v), wherein the motion estimation of i) in subsequent iterations is based on the original picture to be encoded, the reconstructed reference picture or a region of the reconstructed reference picture of the reference picture buffer, and the processed reference picture.

EEE7. The method of any one of enumerated example embodiments 1-6, inclusive, wherein the reconstructed reference picture is an original reference picture of the reference picture buffer that has not been processed.

EEE8. The method of any one of enumerated example embodiments 1-6, inclusive, wherein the reconstructed reference picture is a previously processed reference picture.

EEE9. The method of any one of enumerated example embodiments 1-6, inclusive, wherein the previously processed reference picture has been processed by applying at least one of alternative motion model parameters, alternative interpolation filter parameters, alternative intensity compensation parameters, and alternative denoising filter parameters.

EEE10. The method of enumerated example embodiment 9, wherein the at least one of alternative motion model parameters, alternative interpolation filter parameters, alternative intensity compensation parameters, and alternative denoising filter parameters is estimated from a previous original picture to be encoded.

EEE11. The method of enumerated example embodiment 9, wherein the at least one of alternative motion model parameters, alternative interpolation filter parameters, alternative intensity compensation parameters, and alternative denoising filter parameters is estimated from a previous original picture to be encoded and the previously processed reference picture.

EEE12. The method of any one of enumerated example embodiments 1-2 or 5-11, inclusive, wherein the processed reference picture is used as a reference for subsequent motion estimation in the iteration.

EEE13. The method of any one of enumerated example embodiments 1-12, inclusive, wherein the motion estimation comprises a block-based motion estimation.

EEE14. The method of any one of enumerated example embodiments 1-12, inclusive, wherein the motion estimation comprises a frequency correlation method or a phase correlation method.

EEE15. The method of any one of enumerated example embodiments 1-12, inclusive, wherein the motion estimation comprises a pixel-level motion estimation method.

EEE16. The method of any one of enumerated example embodiments 2-15, inclusive, wherein the further motion estimation is a gradient descent estimation method.

EEE17. The method of enumerated example embodiment 16, wherein the gradient descent estimation method utilizes a fitting method selected from the group consisting of a Newton-Raphson iterative method, Levenberg-Marquadet iterative method, and a least square estimator.

EEE18. The method of any one of enumerated example embodiments 2-17, inclusive, wherein the further motion estimation utilizes a single motion model.

EEE19. The method of any one of enumerated example embodiments 2-17, inclusive, wherein the further motion estimation utilizes a plurality of motion models.

EEE20. The method of enumerated example embodiment 18 or 19, inclusive, wherein the single motion model or plurality of motion models is selected from the group consisting of translational, zoom, rotation, isotropic, affine, perspective, and polynomial motion models.

EEE21. The method of any one of enumerated example embodiments 2-20, inclusive, wherein the motion model parameters are from previously encoded or processed pictures.

EEE22. The method of any one of enumerated example embodiments 2-20, inclusive, wherein the motion model parameters are from previously processed regions of the same picture.

EEE23. The method of any one of enumerated example embodiments 2-22, inclusive, wherein the reconstructed reference picture is divided into a plurality of overlapping regions.

EEE24. The method of any one of enumerated example embodiments 2-22, inclusive, wherein the reconstructed reference picture is divided into a plurality of non-overlapping regions.

EEE25. The method of any one of enumerated example embodiments 16-24, wherein the processing of the motion model parameters through interpolation filter selection and intensity compensation estimation is also based on the original picture to be encoded and the reconstructed reference picture.

EEE26. The method of any of enumerated example embodiments 5-25, inclusive, wherein said filtering comprises denoising filtering.

EEE27. The method of any of enumerated example embodiments 5-26, inclusive, wherein the warping is performed based on the reconstructed reference picture.

EEE28. The method of enumerated example embodiment 3 or 4, inclusive, wherein the motion model parameters are selected based on the warped picture.

EEE29. The method of enumerated example embodiment 5 or 6, inclusive, wherein the motion model parameters are selected based on the processed reference picture.

EEE30. The method of any one of enumerated example embodiments 2-26, inclusive, wherein the motion model parameters are selected based on a distortion cost, rate-distortion cost, distortion complexity, or rate-distortion complexity.

EEE31. The method of any one of enumerated example embodiments 3-22, inclusive, wherein motion model parameter estimation of regions of a picture occurs through analysis of overlapping or non-overlapping regions.

EEE32. The method of enumerated example embodiment 31, wherein the analysis comprises averaging.

EEE33. The method of enumerated example embodiment 31, wherein the analysis comprises weighted averaging.

EEE34. The method of enumerated example embodiment 31, wherein the analysis comprises applying a plurality of motion models to any one of the overlapping or non-overlapping regions and obtaining averages based on contribution of each motion model in the plurality of motion models.

EEE35. The method of enumerated example embodiment 31, wherein the analysis comprises applying a plurality of motion models to any one of the overlapping or non-overlapping regions and obtaining weighted averages based on contribution of each motion model in the plurality of motion models.

EEE36. The method of enumerated example embodiment 35, wherein weights of the weighted averaging are signaled to the decoder.

EEE37. The method of enumerated example embodiment 31, wherein the analysis comprises performing deblocking across region boundaries.

EEE38. The method of enumerated example embodiment 37, wherein pixel based methods are used in performing deblocking.

EEE39. The method of enumerated example embodiment 37, wherein frequency domain methods are used in performing deblocking.

EEE40. The method of enumerated example embodiment 25, wherein interpolation filter selection is performed based on warping and rate distortion considerations.

EEE41. The method of enumerated example embodiment 25, wherein interpolation filter selection is signaled to the decoder.

EEE42. The method of enumerated example embodiment 5 or 6, inclusive, wherein interpolation filter parameters are obtained from the motion model parameters and the interpolation filter parameters further depend on filter parameters from a plurality of independent interpolation filters.

EEE43. The method of enumerated example embodiment 42, wherein the plurality of independent interpolation filters pertains to a plurality of pixel precision levels.

EEE44. The method of enumerated example embodiment 43, wherein the plurality of independent interpolation filters comprises a plurality of fixed filters, wherein each fixed filter is identified by a fixed filter index.

EEE45. The method of enumerated example embodiment 43, wherein the plurality of independent interpolation filters comprises at least one fixed filter and at least one explicit filter.

EEE46. The method of enumerated example embodiment 44, wherein the plurality of fixed filters is signaled for all precision levels corresponding to the plurality of fixed filters by use of the fixed filter index corresponding to each fixed filter of the plurality of fixed filters.

EEE47. The method of enumerated example embodiment 44, wherein;
the plurality of fixed filters comprises a first fixed filter and a second fixed filter,
the first fixed filter is identified by a first fixed filter index and the second fixed filter is identified by a second fixed filter index, and
the fixed filter performs interpolation up to a first pixel precision level and the second fixed filter performs interpolation for remaining pixel precision levels higher than the first pixel precision level.

EEE48. The method of enumerated example embodiment 47, wherein the first fixed filter is signaled for all pixel precision levels corresponding to the first fixed filter by use of the first fixed filter index and the second fixed filter is signaled for all pixel precision levels corresponding to the second fixed filter by use of the second fixed filter index.

EEE49. The method of enumerated example embodiment 43, wherein the independent interpolation filters are adapted for use with 16-bit arithmetic.

EEE50. The method of enumerated example embodiment 44 or 45, inclusive, wherein the independent interpolation filters are adapted for use with 16-bit arithmetic.

EEE51. The method of enumerated example embodiment 45, wherein the at least one explicit filter is signaled for all pixel precision levels corresponding to the at least one explicit filter.

EEE52. The method of enumerated example embodiment 50, wherein the at least one fixed filter is signaled for all pixel precision levels corresponding to the at least one fixed filter by use of the fixed filter index corresponding to the at least one fixed filter.

EEE53. The method of enumerated example embodiment 50, wherein the at least one explicit filter is signaled for all pixel precision levels corresponding to the at least one explicit filter.

EEE54. The method of enumerated example embodiment 43, wherein the relationship between each pixel precision level and its corresponding interpolation filter to be used at the said precision level is inferred from type of interpolation filter used.

EEE55. The method of enumerated example embodiment 43, wherein the relationship between each pixel precision level and its corresponding interpolation filter to be used at the said precision level is signaled in a bitstream to the decoder.

EEE56. The method of enumerated example embodiment 42 or 43, inclusive, wherein independent interpolation filters are selected from the group consisting of bilinear, Lanczos, bicubic, Mitchell-Netravali, wavelet based, bandlet based, motion-compensated temporal filtering based, and explicit interpolation filters.

EEE57. The method of enumerated example embodiment 2 or 26, inclusive, wherein a denoising filter performing denoising filtering is obtained using a least square estimator.

EEE58. The method of enumerated example embodiment 2 or 26, inclusive, wherein a denoising filter performing denoising filtering is obtained jointly with an estimation process of at least one of the motion model parameters, the interpolation filter parameters, and the intensity compensation parameters.

EEE59. The method of enumerated example embodiment 2 or 26, inclusive, wherein a denoising filter performing denoising filtering is obtained after completion of an estimation process of the motion model parameters, the interpolation filter parameters, and the intensity compensation parameters.

EEE60. The method of any one of enumerated example embodiments 2, 26, 58, or 59, inclusive, wherein a denoising filter performing denoising filtering is selected from the group consisting of Gaussian filters, median filters, and ordered filters.

EEE61. A method for decoding a reconstructed reference picture or a region of the reconstructed reference picture of a reference picture buffer at a decoder, the decoder adapted to receive and parse parametric information acquired from an encoder, when performing reference picture processing in a single-layered or multi-layered video coding system, the method comprising:
  i) performing warping of an input picture to obtain a first processed picture; and
  ii) applying intensity compensation to the first processed picture to obtain a second processed picture.

EEE62. The method of enumerated example embodiment 61, further comprising:
  iii) filtering of the second processed picture to acquire a processed reference picture.

EEE63. The method of enumerated example embodiment 61 or 62, inclusive, wherein warping is performed based on the reconstructed reference picture.

EEE64. The method of any one of enumerated example embodiments 61-63, inclusive, wherein warping is performed based on motion model parameters and interpolation filter parameters.

EEE65. The method of any one of enumerated example embodiments 61-64, inclusive, wherein intensity compensation is performed based on intensity compensation parameters.

EEE66. The method of any one of enumerated example embodiments 61-64, inclusive, wherein denoising filter is performed based on denoising filter parameters.

EEE67. The method of any one of enumerated example embodiments 61-64, inclusive, wherein deblocking filtering is performed based on deblocking filter parameters.

EEE68. The method of enumerated example embodiment 61 or 62, inclusive, wherein the reconstructed reference picture is an original reference picture of the reference picture buffer that has not been processed.

EEE69. The method of enumerated example embodiment 61 or 62, inclusive, wherein the reconstructed reference picture is a previously processed reference picture.

EEE70. The method of enumerated example embodiment 61 or 62, inclusive, wherein the previously processed reference picture has been processed by applying at least one of alternative motion model parameters, alternative interpolation filter parameters, alternative intensity compensation parameters, and alternative denoising filter parameters.

EEE71. The method of enumerated example embodiment 70, wherein the at least one of alternative motion model parameters, alternative interpolation filter parameters, alternative intensity compensation parameters, and alternative denoising filter parameters is estimated from a previous original picture to be encoded.

EEE72. The method of enumerated example embodiment 70, wherein the at least one of alternative motion model parameters, alternative interpolation filter parameters, alternative intensity compensation parameters, and alternative denoising filter parameters is estimated from a previous original picture to be encoded and the previously processed reference picture.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the reference processing methods of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] Advanced video coding for generic audiovisual services, http://www.itu.int/rec/recommendation.asp?type=folders&lang=e&parent=T-REC-H.264, March 2010.
[2] SMPTE 421M, "VC-1 Compressed Video Bitstream Format and Decoding Process," April 2006.
[3] G. J. Sullivan and T. Wiegand, "Rate-distortion optimization for video compression," IEEE Signal Processing Magazine, vol. 15, issue 6, November 1998.
[4] Y. He, B. Feng, S. Yang, Y. Zhong, "Fast Global Motion Estimation for Global Motion Compensation Coding," 2001 IEEE International Symposium on Circuits and Systems (ISCAS' 2001), May 2001, Page(s): 233-236 vol. 2.

What is claimed is:
1. A method for processing a reference picture, comprising:
  i) performing motion estimation on an original picture to be encoded, based on a reconstructed reference picture, and a processed reference picture estimate to provide motion model parameters;

ii) further processing the motion estimated picture to obtain a further processed reference picture estimate; and iterating the motion estimation and the further processing to provide a processed reference picture, wherein:

the reconstructed reference picture is divided into a plurality of regions, the performing of the motion estimation provides motion model parameters for the plurality of regions, and for at least one region of the reconstructed reference picture in the plurality of regions, the performing of the motion estimation comprises applying a plurality of motion models to the at least one region of the reconstructed reference picture to provide motion model parameters associated with the at least one region of the reconstructed reference picture, wherein each motion model among the plurality of motion models is applied to the at least one region of the reconstructed reference picture separately, the motion model parameters associated with the at least one region being an average or weighted average of motion model parameters provided by applying each of the plurality of motion models to the at least one region of the reconstructed reference picture separately, wherein the applying a plurality of motion models to the at least one region of the reconstructed reference picture comprises:

applying a first motion model on the at least one region to generate a first set of motion model parameters; and applying a second motion model on the at least one region to generate a second set of motion model parameters, wherein the motion model parameters associated with the at least one region is obtained by an average or a weighted average of the first set of motion model parameters with the second set of motion model parameters.

2. The method as recited in claim 1, wherein the further processing comprises further motion estimation and estimating at least one of interpolation filter parameters, intensity compensation parameters, and denoising filter parameters, and applying the motion model parameters and the at least one of interpolation filter parameters, intensity compensation parameters, and denoising filter parameters to the reconstructed reference picture.

3. The method as recited in claim 1, wherein the reconstructed reference picture comprises an original reference picture retrieved from the reference picture buffer, devoid of any processing subsequent to being retrieved from the reference picture buffer and prior to the performing of motion estimation.

4. The method as recited in claim 1, wherein the reconstructed reference picture comprises a previously processed reference picture, the previously processed reference picture being a reference picture that has been processed subsequent to being retrieved from the reference picture buffer and prior to the performing of motion estimation.

5. The method as recited in claim 4, wherein the previously processed reference picture has been processed by applying at least one of alternative motion model parameters, alternative interpolation filter parameters, alternative intensity compensation parameters, and alternative denoising filter parameters.

6. The method as recited in claim 5, wherein the at least one of alternative motion model parameters, alternative interpolation filter parameters, alternative intensity compensation parameters, and alternative denoising filter parameters is estimated from a previous original picture to be encoded.

7. The method as recited in claim 5, wherein the at least one of alternative motion model parameters, alternative interpolation filter parameters, alternative intensity compensation parameters, and alternative denoising filter parameters is estimated from a previous original picture to be encoded and the previously processed reference picture.

8. The method as recited in claim 1, wherein the processed reference picture is used as a reference for subsequent motion estimation in the iteration.

9. The method as recited in claim 1, wherein the motion estimation comprises at least one of:
a block-based motion estimation;
a frequency correlation motion estimation;
a phase correlation motion estimation;
a pixel-level motion estimation; or
a gradient descent estimation.

10. The method as recited in claim 1, wherein the at least one region of the reconstructed reference picture is formed by an overlap of at least a first region and a second region among the plurality of regions of the reconstructed reference picture, and wherein the applying a plurality of motion models to the at least one region of the reconstructed reference picture comprises:

applying a first motion model on the first region to generate a first set of motion model parameters; and applying a second motion model on the second region to generate a second set of motion model parameters, thus applying the first and second motion models to the at least one region of the reconstructed reference picture, wherein the motion model parameters associated with the at least one region is obtained by an average or a weighted average of the first set of motion model parameters with the second set of motion model parameters.

11. The method as recited in claim 2, wherein at least one of the intensity compensation parameters is derived based only on luma components.

12. The method as recited in claim 2, wherein a first intensity compensation parameter is derived based only on a luma component and a second intensity compensation parameter is derived based on the first intensity compensation parameter.

13. A non-transitory computer readable storage medium that tangibly stores encoded instructions, which when executing over at least one processor, causes, programs, controls, or configures the processor to perform, the method as recited in claim 1.

14. A video encoder, comprising:
at least one processor; and
a non-transitory computer readable storage medium comprising instructions that are stored therewith, which when executing over the at least one processor, causes, programs, controls, or configures the processor to:
perform the method as recited in claim 1.

\* \* \* \* \*